United States Patent [19]
Lockwood

[11] Patent Number: 5,576,951
[45] Date of Patent: Nov. 19, 1996

[54] AUTOMATED SALES AND SERVICES SYSTEM

[76] Inventor: Lawrence B. Lockwood, 5935 Folsom Dr., La Jolla, Calif. 92037

[21] Appl. No.: 210,301

[22] Filed: Mar. 16, 1994

Related U.S. Application Data

[63] Continuation of Ser. No. 116,654, Sep. 3, 1993, Pat. No. 5,309,355, and Ser. No. 96,610, Jul. 23, 1993, abandoned, and a continuation-in-part of Ser. No. 116,654, and Ser. No. 96,610, which is a continuation of Ser. No. 752,026, Aug. 29, 1991, abandoned, which is a continuation of Ser. No. 168,856, Mar. 16, 1988, abandoned, which is a continuation of Ser. No. 822,115, Jan. 24, 1986, abandoned, which is a continuation-in-part of Ser. No. 613,525, May 24, 1984, Pat. No. 4,567,359, said Ser. No. 116,654, is a continuation of Ser. No. 396,283, Aug. 21, 1989, abandoned, which is a continuation-in-part of Ser. No. 152,973, Feb. 8, 1988, abandoned, which is a continuation-in-part of Ser. No. 822,115.

[51] Int. Cl.$^6$ .................................................. G06F 19/00
[52] U.S. Cl. .......................................... 395/227; 235/381
[58] Field of Search .................................. 364/401, 407; 235/383, 385, 381; 395/600, 650

[56] References Cited

U.S. PATENT DOCUMENTS

| | | | |
|---|---|---|---|
| Re. 32,115 | 4/1986 | Lockwood et al. | 235/381 |
| 3,718,906 | 2/1973 | Lightner . | |
| 3,956,615 | 5/1976 | Anderson et al. . | |
| 4,300,040 | 11/1981 | Gould et al. | 235/381 |
| 4,359,631 | 11/1982 | Lockwood et al. | 235/381 |
| 4,438,326 | 3/1984 | Uchida | 235/379 |
| 4,449,186 | 5/1984 | Kelly et al. | 364/407 |
| 4,567,359 | 1/1986 | Lockwood | 235/381 |
| 4,648,037 | 3/1987 | Valentino | 364/408 |
| 4,650,977 | 3/1987 | Couch | 235/379 |
| 5,241,671 | 8/1993 | Reed et al. | 395/600 |
| 5,309,355 | 5/1994 | Lockwood | 364/401 |

*Primary Examiner*—Donald E. McElheny, Jr.
*Attorney, Agent, or Firm*—Henri J. A. Charmasson; John D. Buchaca

[57] ABSTRACT

A system for composing individualized sales presentations created from various textual and graphical information data sources to match customer profiles. The information search and retrieval paths sift through a hierarchy of data sources under multiple operating programs. The system provides the means for synergistically creating and displaying customized presentations in a convenient manner for both the customer and salesperson to achieve a more accurate, efficient and comprehensive marketing presentation. Organizational hierarchies of data sources are arranged so that an infinite number of sales presentation configurations can be created. Multiple micro-programs automatically compose the sales presentations initiated by determinants derived from customer profile information, sales agent assessment data and operator's entries including the retrieval of interrelated textual and graphical information from local and remote storage sources. A similar system can be used for filing applications with an institution from a plurality of remote sites, and for automatically processing applications in response to each applicant's qualifications. Each multimedia terminal comprises a video screen and a video memory which holds co-related image-and-sound-generating information arranged to simulate the aspect and speech of an application loan officer on the video screen. The simulated loan officer is used to acquire personal loan data from the applicant by guiding him through an interactive sequence of inquiries and answers.

10 Claims, 17 Drawing Sheets

AUTOMATED SALES AND SERVICES SYSTEM

PRIOR APPLICATIONS

This is a continuation-in-part of application Ser. No. 08/116,654 filed Sep. 3, 1993, now U.S. Pat. No. 5,309,355 which is a continuation of abandoned application Ser. No. 07/396,283 filed Aug. 21, 1989, which is a continuation-in-part of abandoned application Ser. No. 07/152,973 filed Feb. 8, 1988, which is a continuation-in-part of abandoned application Ser. No. 822,115 filed Jan. 24, 1986, which is a continuation-in-part of application Ser. No. 613,525 filed May 24, 1984, now U.S. Pat. No. 4,567,359.

This is also a continuation-in-part of abandoned application Ser. No. 08/096,610 filed Jul. 23, 1993, which is a continuation of abandoned application Ser. No. 07/752,026 filed Aug. 29, 1991 which is a continuation of abandoned application Ser. No. 168,856 filed Mar. 16, 1988, which is a continuation of abandoned application Ser. No. 822,115 filed Jan. 24, 1986 which is a continuation-in-part of application Ser. No. 613,525, filed May 24, 1984, now U.S. Pat. No. 4,567,359.

This is also a continuation of the combination of the above-cited applications Ser. No. 08/116,654 filed Sep. 3, 1993 and Ser. No. 08/096,610 filed Jul. 23, 1993.

BACKGROUND OF THE INVENTION

This invention is directed to data processing systems designed to facilitate commercial, financial and educational transactions between multimedia terminals such as automated sales workstations, information dispensing networks and self-service banking systems. Specifically this invention is directed to a tool for augmentation of sales and marketing capabilities of travel agency personnel in conjunction with computerized airline reservation systems. This invention also relates to financial service application processing, and interactive delivery of informative, educational and recreational audio-visual programs to the home, school or office.

In the preferred embodiments of the invention, travel agents are able to synergistically compose individual customized sales presentations and itineraries for their clients, representing thousands of tour destinations and criteria, from multiple permutations of data sources in a fully automated fashion.

During the 1980s airline reservation systems evolved into very sophisticated information networks. A majority of travel agencies in North America subscribe to one of the major computerized reservation systems; Sabre, Apollo, System One, or WORLDSPAN. Prior to the development of computerized reservation systems in the 1970s, a travel agent would read airline schedules from either the North American or International edition of Official Airline Guides (OAG), printed directories which are published monthly, then telephone the specific airline to reserve-and confirm passenger flights and physically write the airline tickets. The advent of computerized reservation systems allowed the travel agent to access computerized travel data banks, reserve, confirm and transact airline, hotel or car rental reservations with a 'dumb terminal' comprised of; keyboard entry of customer requirements in conjunction with a display terminal and ticket printer, connected to the centralized reservation service. The Mar. 19, 1985 testimony of Robert L. Crandall, President of American Airlines, Inc., before the Aviation Subcommittee of the Senate Committee on Commerce, Science and Transportation details the evolution of computerized reservation systems in the United States.

Travel agency employees, who produce approximately seventy-five percent of the computerized reservation systems volume, now enjoy a more productive and accurate means to process reservations, an important part of their service functions. A simultaneous sector of a travel agent's employment is the ability to promote, advise, select and sell appropriate travel and tour destinations for their clients. Agencies generate approximately fifty percent of car rental bookings, seventy percent of domestic air travel sales and ninety percent of international flights.

Travel agents sell nearly ninety percent of all cruise line bookings and virtually ninety percent of all tour packages. This business represents the most profitable segment of the multi-billion dollar travel agency sales volume, since higher commissions are earned on tour/cruise bookings as compared with point-to-point airline ticketing. The ability of a travel agent to effectively consult with their clients depends upon several factors including; knowledge of the destination, familiarization tours the agent may have taken to the area, attendance at travel/tour seminars and conferences and reading reference literature such as Fordor's travel publications.

A travel professional accumulates extensive knowledge which is extremely valuable to the travel agency business and is in fact, the single most important element which differentiates one agent from another. Unfortunately, this knowledge requires years of experience to acquire. The physical requirements to visit and inspect even a portion of popular tourist destinations dictates a significant investment of time and monetary expense. Additionally, tourist localities are seldom static; new hotels or attractions and changing custom regulations require a constant monitoring of hundreds of potential vacation sites.

The current state-of-the-art of the tour, cruise and vacation market segments is similar in many respects to the pre-computerized reservation systems airline era. A travel agent must consult several directories; i.e., Hotel and Travel Index, OAG Travel Planner, OAG Worldwide Tour Guide or OAG Worldwide Cruise and Shipline Guides and scores of travel brochures in an attempt to offer the client information for an informed travel decision. Most of these directories are published quarterly so therefore prices or schedules are frequently out-of-date and inaccurate. If the client is conferring in person, with the agent in the office, this task is complicated by the reliance on numerous publications to describe a particular vacation. This often results in a time-consuming, disorganized and ineffective sales presentation since each client's itinerary has different requirements. Answering a client's questions is dependent upon the knowledge a travel agent has acquired. Since 'travel' is an intangible product, the communicative skills of the travel agent are paramount to success. The client relies on the travel agent's advice in making important vacation decisions.

Several specialized tour planning concepts emerged in the 1970s including publications such as Fishing Resorts of The World, which presented sportfishing tour packages in an organized and informative manner and audio-visual presentations of tour destinations such as TRAVEL-VISION which were linear in design. These travel marketing concepts, both created by applicant, had inherent limitations as discussed herein.

The travel industry, comprising 33,000 agencies, does not sell a single mass market product, but rather is a reflection of the population as a whole with its infinite individual customer profiles of demographic, regional and fields of special interest. One client may desire information on a river-rafting tour in Wyoming while the next customer needs assistance in planning an art tour of Paris, France. Therefore, it is imperative that the travel agent have available a wide variety of information in an organized system which allows convenient and standardized access for both the agent and client.

A recent study of the American labor force, Work Force 2000: Work and Workers for the Twenty-first Century, commissioned by the United States Department of Labor, indicates serious shortages of skilled workers in the service sector economy will impact the United States during the 1990's and into the next century. In addition to labor shortages in many skilled service sector industries, it is predicted that a mismatch of employee skills to available jobs will result in a shrinking labor pool of skilled workers which will inevitably increase wages. Travel agency functions are predominantly labor intensive, therefore labor shortages of skilled workers will significantly impact the quality of service they provide.

All travel agencies essentially market the same products and represent the same suppliers, therefore as a service sector industry it is incumbent that individual sales skills and support systems be as comprehensive and efficient as possible. Since the travel industry is highly dependent upon knowledgeable professionals, requiring years of experience, it portends that a more efficient travel/tour sales and training system be implemented to compensate and increase the productivity of the travel agent.

Thus, there is a continuing need to provide the means to assist travel agency personnel and their clients with a more responsive and efficient; educational, training, sales and service system.

A first alternate embodiment of the invention relates to multimedia terminals used by banking institutions to make their services, such as loan processing, available at all hours of the day from various remote locations.

Loan processing has traditionally been a labor-intensive business which represents the major activity of banks and other financial institutions. In the processing of a loan application, numerous forms have to be filled-out, loan officers have to explain payment schedules and generally guide the applicant through the loan application process. The financial institution then has to process the application and either telephone, mail, or communicate acceptance or rejection of the loan in person to the applicant. The complexity of the process has so far prevented the application of automatic terminals to perform this important part of financial institution activities. Interactive multimedia terminals have evolved to a high degree of sophistication as disclosed in U.S. Pat. No. 4,359,631 Lockwood, et al. Yet, this high degree of sophistication has not been put to use in the more complex types of goods and services distribution which require a great deal of interaction between individuals and institutions.

A second alternate embodiment of the invention relates to an improvement of a system for automatically dispensing information, products and services by means of stored prerecorded audio-visual presentations telegenically transmitted from a remote site to sales and information terminals in the home under the command of customers with easy-to-use communication equipment that does not require formal computer literate training.

Service providers have traditionally communicated and marketed information and products to consumers in their homes by way of newspapers, magazines, mail order catalogs, direct mail, telephone, radio and television. None of these communication methods allow consumers to interactively display alternate audio-visual sales presentations for transactional order fulfillment. Lately, videotex has emerged as a supplement to traditional product ordering methods. Beginning in 1978, British Telecom established a videotex service named 'Prestel' planned for a mass consumer market. Videotex, a textual display, is not designed nor intended to deliver full color prerecorded audio-visual presentations. Videotex typically requires computer operating knowledge and a personal computer with modem for access. Subsequently several major attempts at introducing videotex in North America have failed and surviving operators have maintained a limited user base. A fundamental reason for the unsuccessful acceptance of videotex is that it requires reading of computer generated text. Conversely, the American consumer has become accustomed to a high degree of television quality programming from sporting events and news to popular movies broadcasted daily.

Interactive delivery of information, goods and services to consumers by means of multimedia terminals is disclosed in U.S. Pat. Nos. 4,359,631 and 4,567,359 using a central processor, audio-visual data sources, CRT, keyboard and remote communication capabilities.

It would be desirable to provide such a system accessible to consumers from their homes or workplace.

Typically consumers have had to travel to multiple stores and shop for products. This is both time-consuming and involves transportation expenses. Certain segments of the population, for example disabled persons and the elderly have been restricted in their ability to compare product features and prices. The system could also allow service suppliers and product manufacturers to communicate directly with consumers and present products, take orders and ship purchases from a central or regional warehouse facility. This would reduce the expense of maintaining retail stores, inventory, sales personnel, overhead and general distribution costs while providing services to hundreds or thousands of homes and offices throughout a community.

Preferably such a system would incorporate; a central data processing center, audio-visual data sources, a CRT for displaying information, communication links and a keyboard for control of the remote data sources. Additionally, such a system would allow consumers an opportunity to communicate with product and service providers to place orders, and to process commercial transactions.

Interactive audio-visual communication systems using television and telephone common carrier networks are now possible based on some of the techniques disclosed in U.S. Pat. Nos. 3,668,307 Face et al., 3,691,295 Fisk, 3,746,780 Stetten et al., 3,752,908 Boenke et al., 4,054,911 Fletcher et al., 4,064,490 Nagel, 4,251,691 Kakihara et al., 4,264,925 Freeman et al., and 4,553,222 Kurland et al.

Research reveals that the average person retains about 25 percent of what they hear and 45 percent of what they see and hear. Retention levels increase dramatically to 70 percent of what a person sees, hears and performs if an interactive sequence is available. Therefore the persuasive power of interactive full color multimedia presentations would be an ideal means to market products and services. This in-home information delivery system could also provide a conduit for educational, medical and other important informational services.

SUMMARY OF THE INVENTION

Accordingly, the objects of this invention, among others are to:

enhance the travel agent's sales ability and professional knowledge of travel and tour destinations in conjunction with computerized reservation systems;

create a flexible travel sales system responsive to multiple applications and configurations;

organize a variety of traditional travel and tour references in a comprehensive and synergistic multimedia sales system to effectuate consumer awareness;

increase the sales productivity and information accuracy of vacation tour packages sold by travel agents;

develop individualized tour planning programs for clients presented in a more effective communication's medium;

reduce travel agent dependency on outdated travel directories, tour manuals and traditional brochures;

provide a consistent in-house teaching and training system for travel agency personnel; and offer travel suppliers and tour operators an enhanced and efficient means to present their products and to communicate with potential customers when selecting vacation destinations.

These and other objects are achieved by the preferred embodiment of the invention which is directed to a means for automatically creating and displaying customized travel and tour sales presentations from various textual and graphical data sources managed by a multiplicity of operating programs. Sales presentations comprise audio-visual data and computerized reservation system information, presented individually or in combination. The graphical data may include charts, maps and other still images as well as moving pictures with or without sound enhancements.

Individualized sales presentations are requested by the client for specific destinations. The organizational hierarchy of data sources is arranged so that an infinite number of variations or sales presentation configurations can be displayed. Multiple operating programs create the sales presentations directed by:

(1) Client profiles stored on optical memory or smart cards;

(2) Travel agent assessment of client profiles; or (3) Computerized reservation system response to client profiles.

The travel agent interviews the client and determines the general information required for accessing the sales system and enters the prerequisites such as; destination, tour costs, sports activities, accommodations and other factors necessary for generation of customized mini-travelogues. The selected factors are analyzed by the operating program based upon an organizational hierarchy of travel specifications which activates the data sources and a customized sequence is presented. Sales presentations can be accessed interactively, one display frame at a time with a decision point at each juncture, or by analysis of the client's profile which generates a coded operating program sequence to display a continuous customized presentation. Additionally, a combination of either interactive or coded program modalities can be presented. A client may wish to preview a destination in an interactive search sequence and upon deciding that the tourist destination is in fact the one he desires, could proceed with an operating program from the input of client characteristics. This alternating procedure allows greater comprehension and sales flexibility.

Operating programs select the presentation chapter segments from either the audio-visual data source repository or the computerized reservation system and arrange them in an orderly and predetermined sequence. The sales presentations incorporate proven 'need satisfaction selling' including: probing, supporting and closing techniques. This assures a maximum sales effort on behalf of the travel industry. Clients are both creators and viewers of the mini-travelogues which are specifically addressing their needs while simultaneously assisting the travel agent in a comprehensive sales effort.

As explained in the first alternate embodiment, another object of the invention is to standardize the reporting and interpretation of credit ratings and their applicability to loan application processing.

A further object of the invention is to reduce the amount of paperwork and processing time required by each loan application.

It is also an object of the invention to offer a more personal way to apply for credit. Many applicants are reluctant to inquire about loans requiring face-to-face interaction with a loan officer, who would not hesitate to use an interactive device to place their inquiry.

These and other objectives are achieved by means of a system that connects financial institution data processing, the computer services of a credit reporting bureau, and a plurality of remote terminals. Each remote terminal displays the live image of a fictitious loan officer who helps the applicant through the interactive series of questions and answers designed to solicit from the applicant all the information necessary to process his loan application. The terminal can acquire credit rating information about the applicant from the credit reporting bureau and make a decision based on all the information gathered about the credit worthiness of the applicant and the amount of loan to which he is entitled. The amount is then communicated to the applicant and to the financial institution for further processing of the loan.

As explained in the second alternate embodiment, additional objects of the instant invention comprise among others, the following:

to provide an automatic and efficient system for dispensing information and services to the general public interactively from terminals in their homes;

to offer such a system which is particularly useful for dispensing information, goods and services for a wide variety of service industries;

to facilitate immediate access to thousands of products and services by the elderly, disabled persons and others limited by travel or time constraints;

to present such services by means of audio-visual presentations for transactional decisions from prerecorded sound, images and synthesized data;

to centralize product distribution, therefore reducing traditional merchandising overhead costs while increasing manufacturer's product selection, target marketing and advertising promotion of products;

to increase service sector productivity while reducing inventories and out-of-stocks by creating an unlimited number of distribution outlets over geographically extended trade areas which operate 24 hours per day;

to maximize information delivery by interactively involving the customer as opposed to passive viewing.

In furtherance of these additional objects, an automatic system is disclosed for dispensing information, goods and services to consumers in their home. The system comprises a central data processing computer and multiple remote satellite facilities linked to the center. The satellite facilities are sales and information terminals, each equipped with a CRT (Cathode Ray Tube) for receiving and displaying requested customer information from the computer's data sources at the data processing center. Customers interactively display the audio-visual presentations by selecting various choices and entering the choices on a telephone keypad which directs the computer to select from its data sources the requested information and transmit it to the customer's CRT in their home.

The system operates in the following sequence:

1. The customer dials the data processing center and requests access to the system.

2. The data processing center verifies the customer and selects from its data sources the general instructional audio-visual presentation which is routed through the customer's local cable television communication link and transmitted to the customer's sales and informational terminal.

3. The customer views the presentation and selects from the menu presented on the screen the next display.

4. The customer enters on the telephone keypad the selection which is transmitted to the data processing center via the telephone communication link.

5. If the customer decides to purchase a product or service he also enters on the keypad the payment information.

6. After verification and acceptance of the payment, a confirmation message is displayed on the customer's CRT video screen.

7. Information on the transaction is transmitted from the data processing center to the relevant product or service company for fulfillment.

This second alternate embodiment of the invention is directed to a system for automatically dispensing information, goods and services from multiple retailers, and from travel, financial, and other service providers. The data processing center is linked to data sources of various product and service providers for order processing. The data processing center is programmed to respond to customer's directions, select requested audio-visual presentations from its data sources of prerecorded information segments and place them on a television network from where they will be decoded, captured and displayed by the customer's home receiver.

If the customer elects to purchase a product or service, his order is processed by the data processing center. After validation and acceptance, confirmation of the order is displayed on their CRT monitor.

The data processing center stores information about the products and services offered by each supplier, and tabulates sales. The data processing center is programmed to transmit periodically to each institution's data processing terminal, either directly or indirectly, for example through an automated telecommunication network service such as TELENET®; up-dated information on sales made by the system for that institution.

Suitable data links, such as phone line, cable television and optical fiber data links can be used between the sales and information terminals and the data processing center, and between the service provider's data processing terminals, either directly or indirectly via common carriers. In the latter case, each institution will have its own particular account number with the service to which information on sales made by the system will be delivered. Similarly, the system itself will have an account number to which each institution can deliver information on any changes in prices or services offered.

The data processing center is suitably also linked to a remote credit information center for checking the credit of a customer in response to a sales order and charging a customer's account via debit card, credit card or alternately customer accounts that are also stored at the data processing center for monthly billing.

DESCRIPTION OF THE PREFERRED EMBODIMENTS OF THE INVENTION

Figure 1:
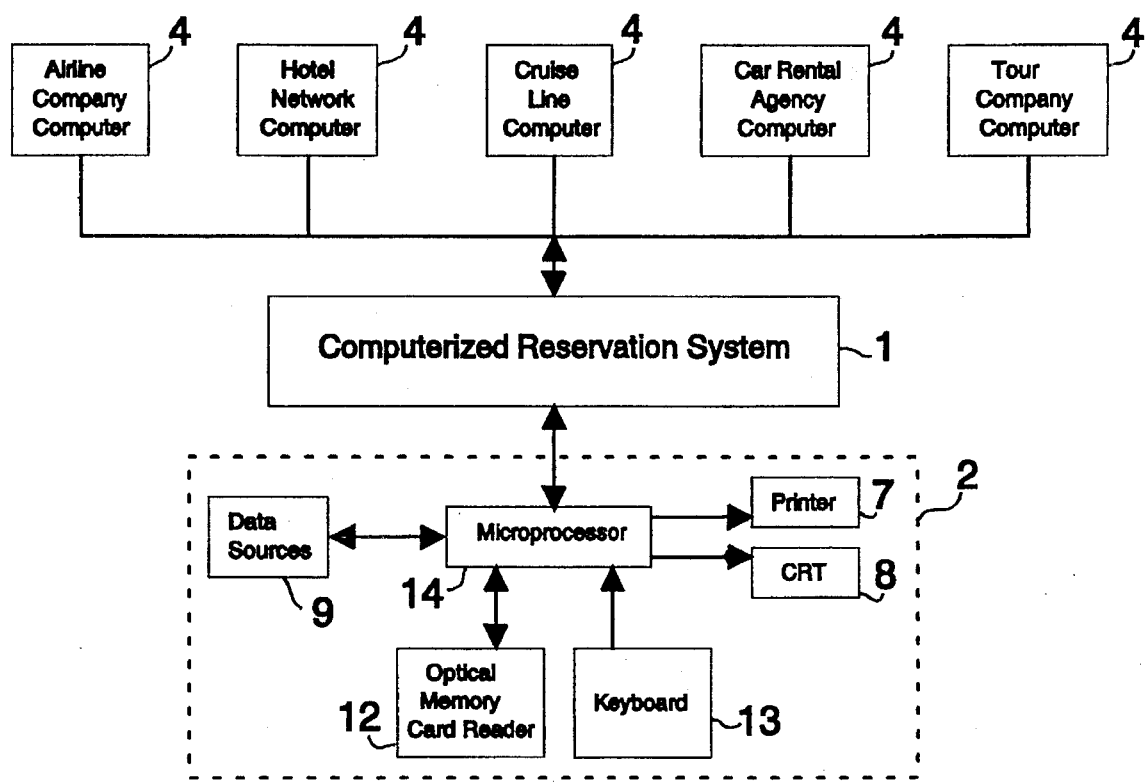
FIG. 1 represents a general block diagram of the overall system for creating customized travel sales presentations of the preferred embodiment of the invention.

FIG. 1 represents a general block diagram of the overall system for creating customized travel sales presentations according to the preferred embodiment of the invention. It will be understood that such a system may be used in a variety of other service-oriented industries, such as retail sales and real estate, various financial services and the like.

The system basically comprises one or more special information and sales terminals 2 linked to an airline computerized reservation system 1 which gives access to the data processing installations of various travel suppliers 4. The terminals are all linked to the computerized reservation system by any suitable remote telecommunication links. This automated travel and tour sales system is preferably achieved according to the teaching of U.S. Pat. Nos. Re. 32,115 and 4,567,359 whose specifications are hereby incorporated herein by this reference.

The information and sales terminals 2 include one or more audio-visual data sources 9. These resident data sources are preferably optical disc based with the capabilities for generation of full motion, still-frame, audio compression and related functions to achieve random access audio-visual presentations directed by a microprocessor 14. Data sources 9 may suitably be implemented with a SONY View System brand of videodisc recorder model VIW-5000 and SONY 650 MB cartridge or a CD-ROM player. Various combinations of interactive audio-visual system technology such as CD-ROM, CD-I or DVI may be incorporated to effectuate the travel presentations. The microprocessor 14 is suitably an IBM PS/2 brand of personal computer. The optical memory card reader 12 is of the type disclosed in U.S. Pat.

Nos. 4,284,716; 4,542,288; and 4,544,835. The printer 7, CRT 8 and keyboard 13 are standard devices and the interfacing of the various components are well-known to those skilled in the data processing arts.

Figure 2:
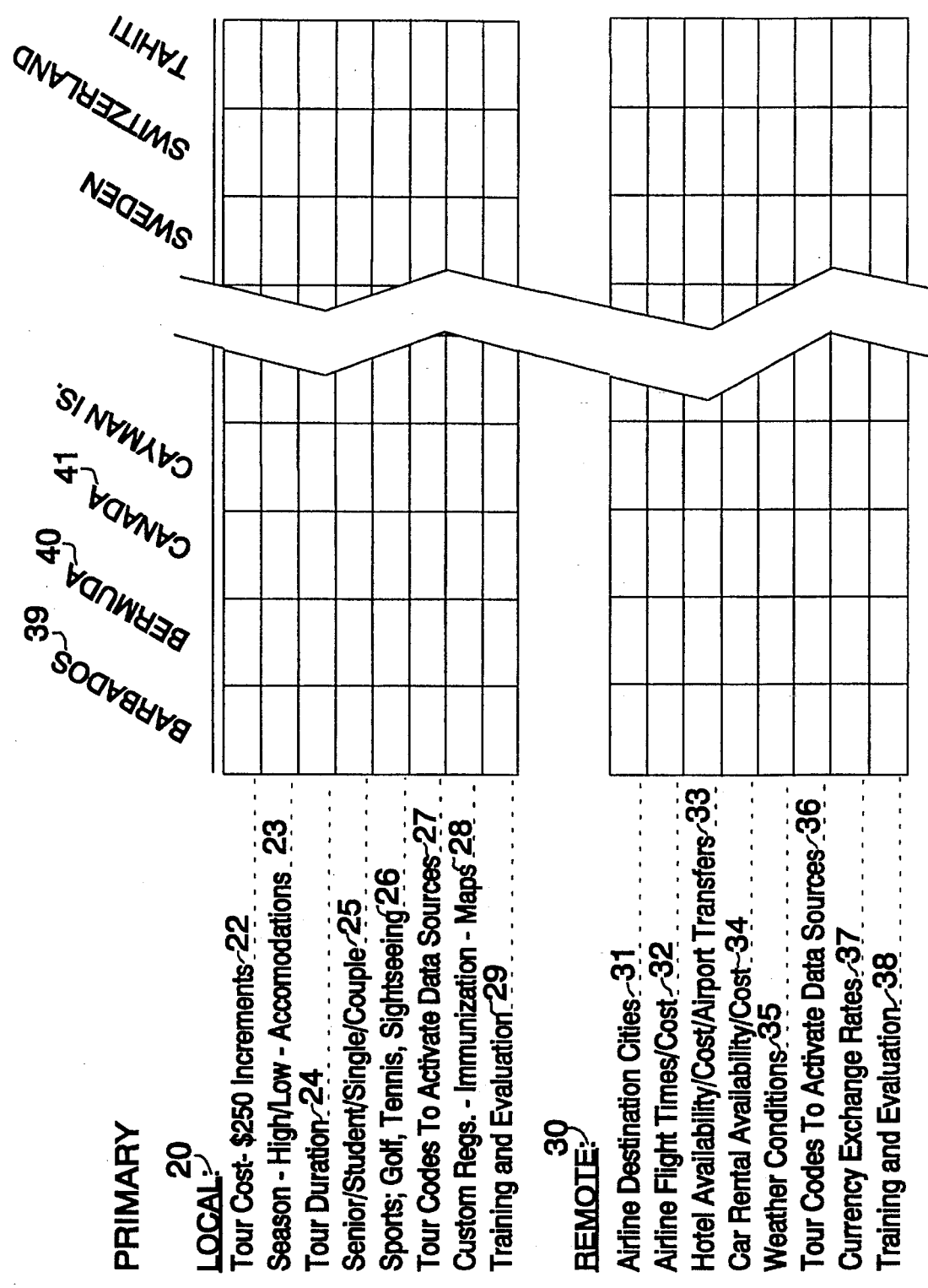
FIGS. 2 and 3 represent organizational charts of travel sales presentations from multiple data sources.

Organizational chart FIG. 2 describes audio-visual chapter segments organized in topics and subtopics which constitute the tour information and which are identifiable and accessible by frame numbers. A standard videodisc contains 54,000 individual frames or 30 minutes of full motion video which can be accessed randomly. The construction of individualized tour package presentations by frame numbers is managed by the program of the microprocessor 14 as will be explained below. The travel agent enters the client's requests and characteristics to initiate the travel presentations. Each numbered chapter segment contains a transition bridge, so that presentations are not abrupt but rather form a continuous, harmonious dialogue with the client composed in a progressive predetermined format to increase sales effectiveness, for example; country, region, city, hotel and sightseeing. Training and evaluation 29 would typically consist of instructional information which would be presented in the form of lessons.

REMOTE 30 represents textual information which is accessed from the computerized reservation system 1. This information; airline flight times 32 and hotel availability 33 is critical to the tour sales presentation if transportation or lodging is required. Therefore, LOCAL 20, and REMOTE 30 act in conjunction to present an integrated and individualized travel and tour sales travelogue. REMOTE 30 creates dynamic presentations of transitory information such as weather conditions 35 or currency exchange rates 37.

REMOTE 30 can transmit tour codes to activate data sources 36 to information and sales terminal 2. This allows the organization of timely vacation tours in the travel agency. In this manner 'special' tours with limited reservation deadlines can be promoted that otherwise could not be marketed in traditional printed brochures.

It will be understood that optimal sales presentation effectiveness is determined by the attention span of the client. Therefore, program design parameters of the mini-travelogues include specific time limitations dependent upon client characteristics. Training and evaluation 38 offer an enhanced instructional program which can also transmit codes to the microprocessor-accessed data sources 9 in concert with transitory information from the computerized reservation system 1 to train and test travel agent proficiency presented on CRT 8.

Figure 3:
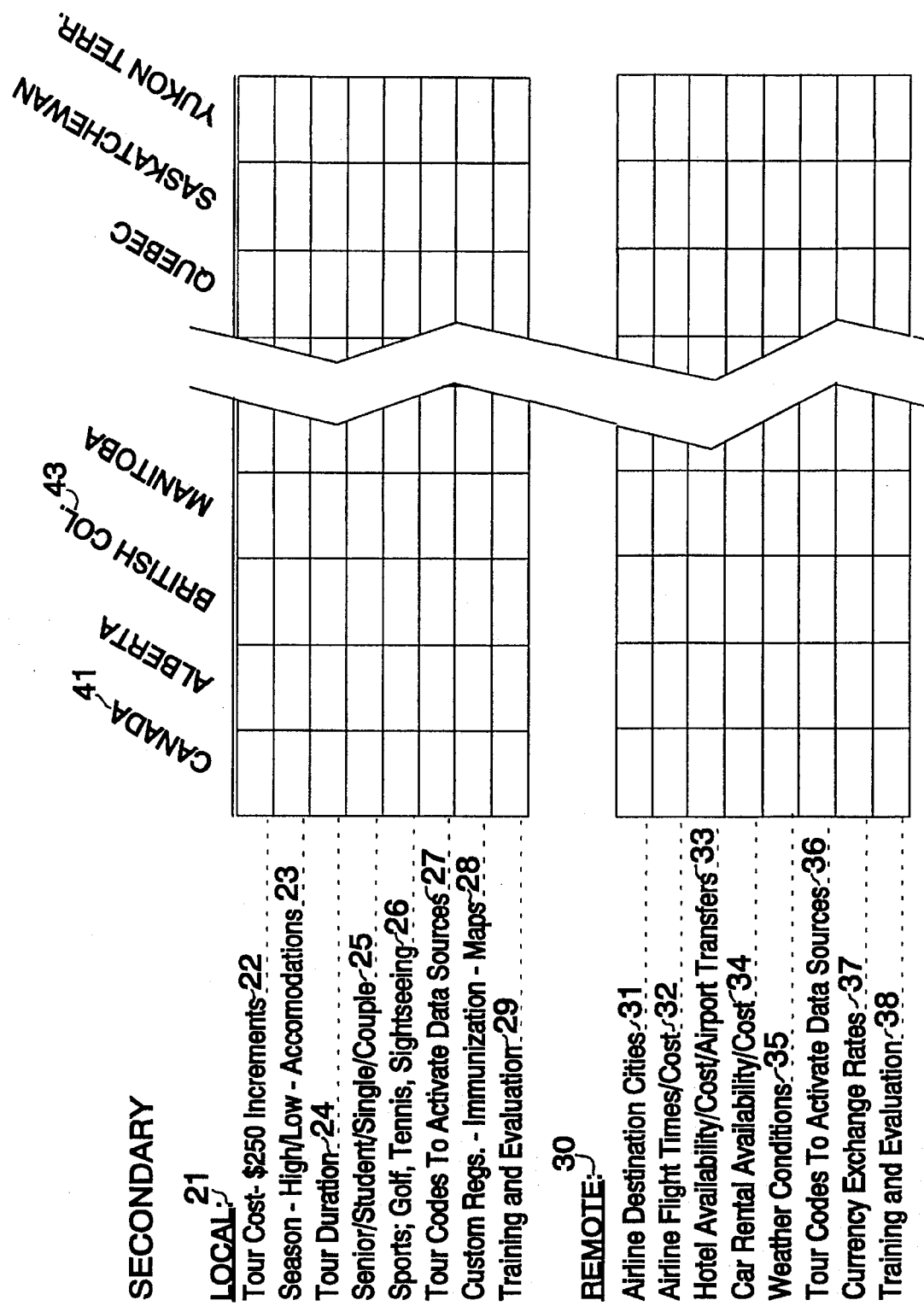

Organizational chart FIG. 3 describes a secondary selection format which further delineates tourist destinations in multiple subsets. If the client selected Canada 41, the microprocessor would define a Canadian province such as British Columbia 43 as a function of the client's characteristics. Additional organizational A1 format can define cities within the selected province and then tourist features within cities.

Figure 4:
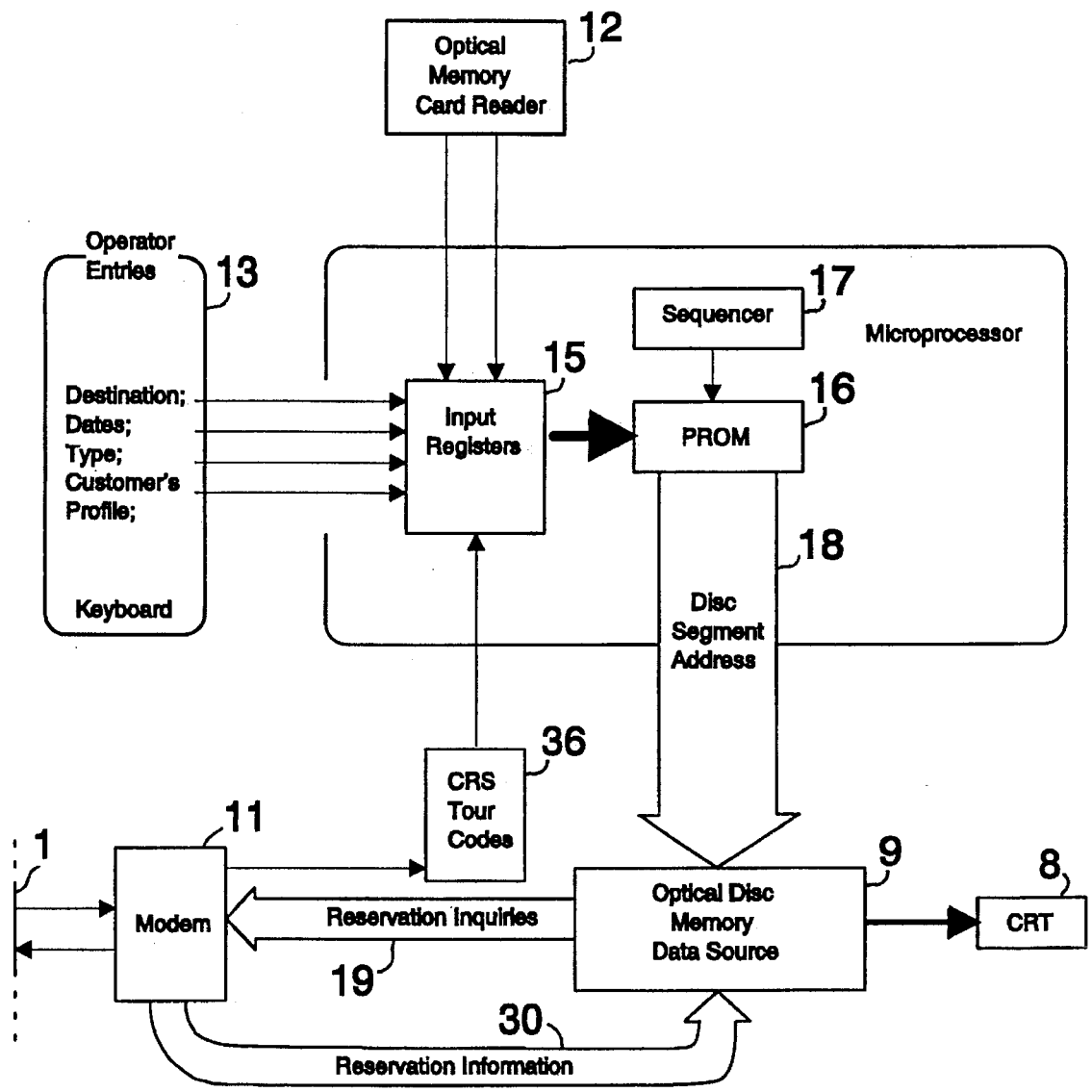
FIG. 4 is a block diagram of the sales presentation organization and display operation.

FIG. 4 illustrates the selection process for the various segments of the sales presentation. The basic selection data which is either entered on the keyboard 13 by the operator or read by the memory card reader 12 are loaded into the input registers 15 of the microprocessor 14. This basic selection data includes the type of service requested (such as ski weekend, cruise, or camping trip), the approximate date of departure and return, the destination and customer characteristics such as age, gender and preferences. This information serves as addresses for a programmable read only memory (PROM) 16 or other similar device which is driven by a sequencer 17 to deliver a series of specific disc segment addresses 18 or pathways for the videodisc memory data source 9. Some of the addressed segments on the videodisc correspond to inquiries 19 which are sent via a modem 11 to the airline reservation system 1. The answers, mostly reservation information 30, when received, are presented on a split-screen or recorded on the erasable optical disc or other suitable medium for display as part of the sales presentation on the CRT 8.

Three types of randomly accessible segments of data are thus stored in the data source 9, the audio-visually displayable narrative chapters, the inquiries to be sent to the reservation system and the essentially textual reservation systems answers to be combined with the narrative chapters.

Thus, the programmation of the entire sales presentation resides in the programming of information access paths in the PROM 16. In other words, the PROM assist the user in his quest by performing automatically and almost instantly, the sequential and time-consuming information accessing, gathering and organization that a travel agent must process using conventional reservation and information sources.

Figure 5:
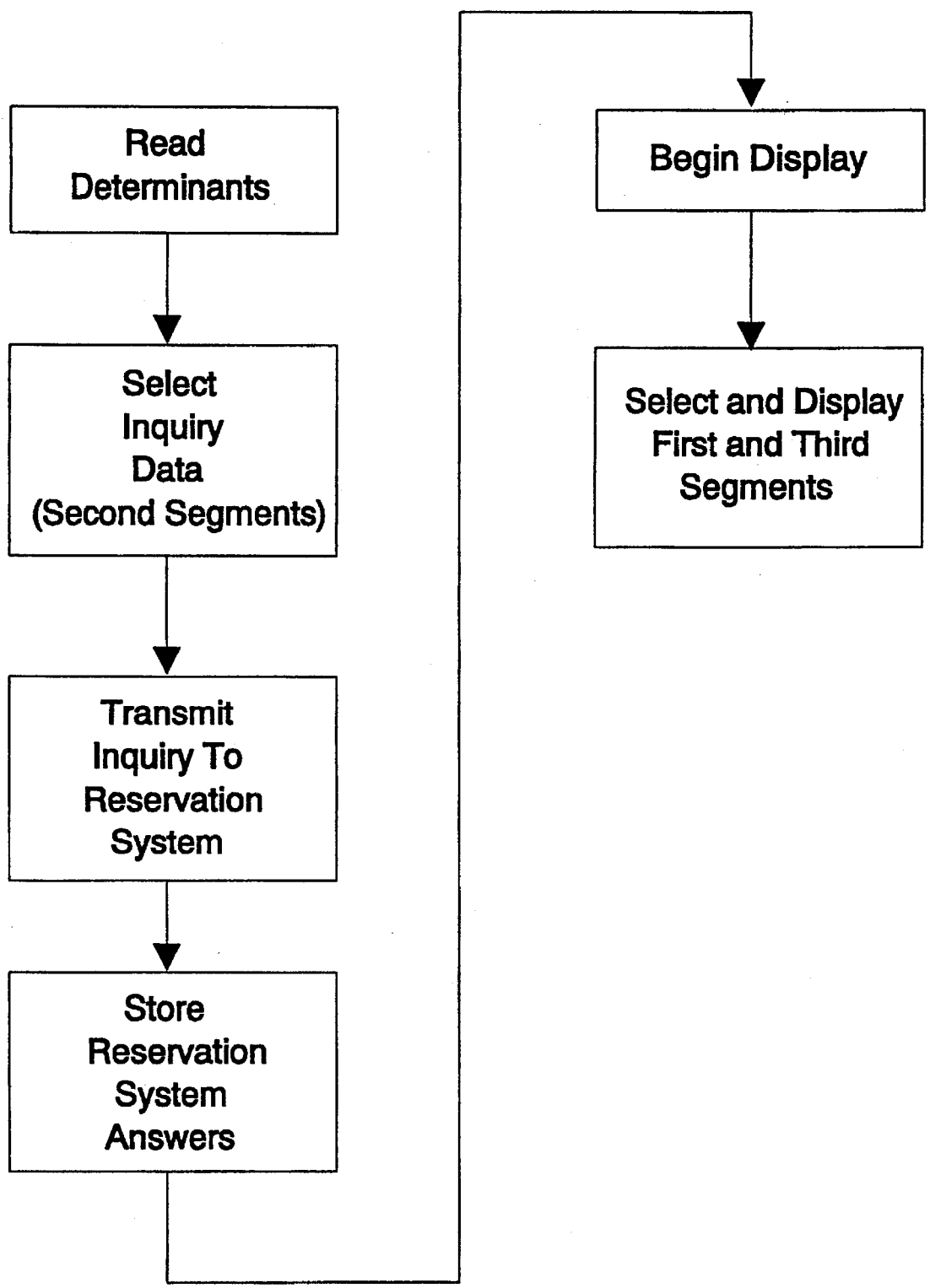
FIG. 5 is a flow diagram of the information selection and display process.

FIG. 5 illustrates the general selection and display process done under instructions issuing from the PROM 16 based on the determinants stored in the input registers 15 under control of the sequencer 17. It should be noted that the first segment of narrative data are the only ones that need to be coded for video display. The second segments are binary coded inquiries to be sent via the modem 11 to the reservation system 1. The answers received from the reservation system are times and prices information which are displayed in alphanumeric form usually in a tabular format which does not require to be translated into variable-gray-scale-video signals, nor any graphic display encoding.

The determinants stored in the register 15 provide an address to the PROM 16 corresponding to a set of instructions. Those instructions are sequentially extracted by the sequencer 17 to trigger the various selection and display steps.

Data sources 9 typically include a videodisc which contains time codes indicating each video frame by hour, minutes, seconds and frame number or picture, chapter or still cue code inserted in the vertical interval of the videodisc which is read by the videodisc player. A frame is a single, complete picture in a video or film recording. A video frame consists of two interlaced fields of either 525 lines running at 30 frames per second (NTSC) or 625 lines at 25 fps (PAL/SECAM). The address is usually an alphanumeric or numeric label identifying a location where information is stored on the videodisc or a time code or frame number identifying the location of video and/or audio material on the optical disc.

A chapter is an independent, self-contained segment of an interactive video program. Chapter number codes are numbers also encoded in the vertical interval of the videodisc frame, allowing chapter numbers to be displayed on the screen during play. Chapter search is a function of most videodisc players allowing specific chapters to be accessed by chapter number or to request a specific frame identified by its unique sequential reference number, which then instructs the videodisc player to move directly forward or backward to that frame from any other point on the videodisc. Chapter stop is a code embedded in videodiscs to signal the break between two separate chapters, allowing specific chapters to be accessed using chapter search. A standard videodisc contains 54,000 individual frames.

Figure 6:
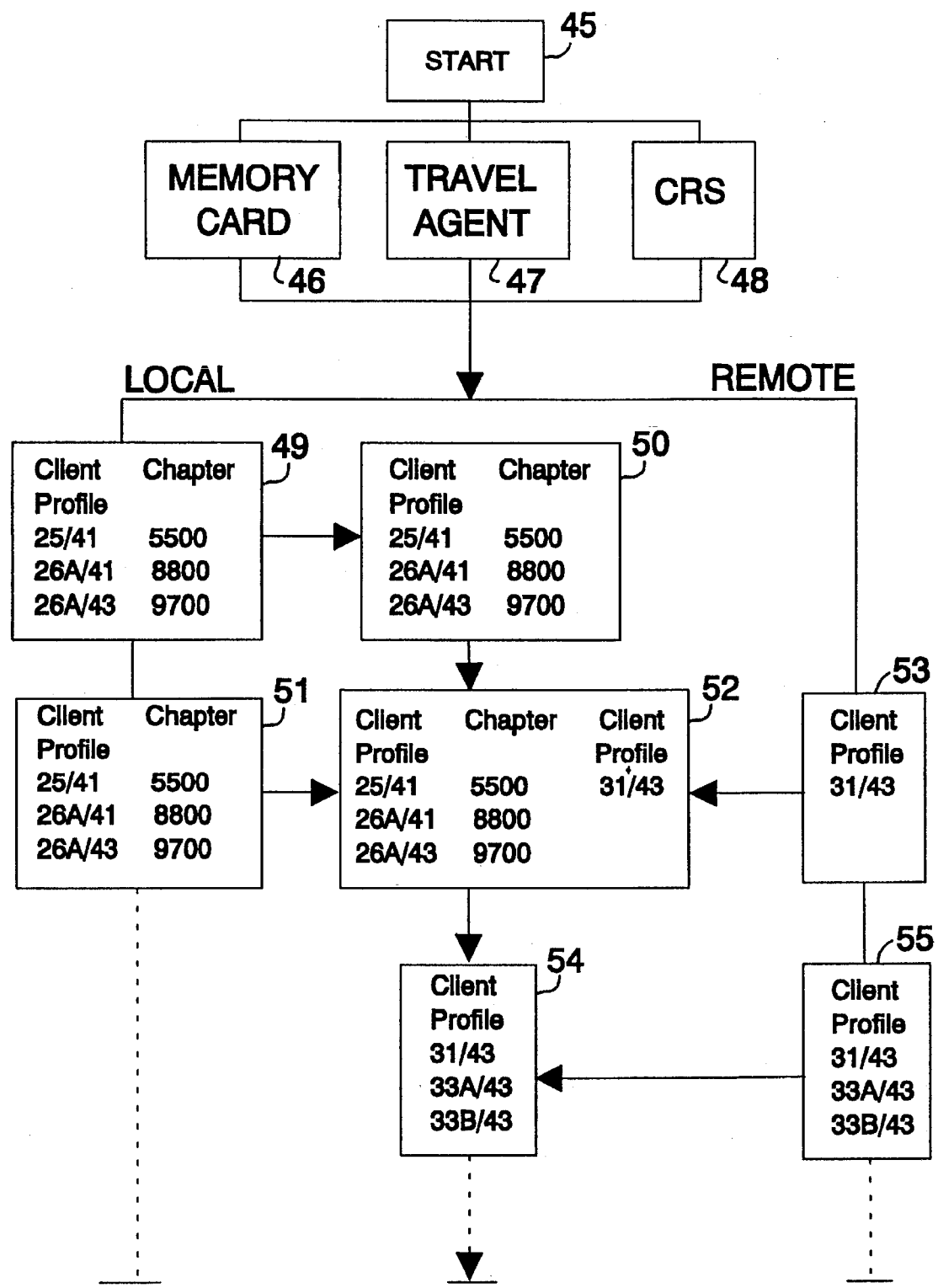
FIG. 6 is a flow diagram of a detailed information selection process.

Proceeding now to FIG. 6 which is a detailed flow diagram of the implementation of the address matrix to compose three sales presentation displays; LOCAL, LOCAL/REMOTE and REMOTE. The program selection is initiated 45 with activation of client's prerequisites from memory card 46, travel agent assessment 47 or by receipt of tour codes from the computerized reservation system in response to client's profile 48. The selection determinants as described in organizational hierarchies FIGS. 2 and 3 depict specific chapter segments which when assembled would constitute an individualized sales presentation.

For example, a typical sales presentation for selecting hotel accomodations 23 which would include displaying pictoral representations of hotels i.e., overview, rooms, restaurants, sporting facilities, swimming pools, and tennis courts. Applicable textual travel information such as Canadian custom and immunization 28 regulations correlatively stored with the hotels information would be displayed textually. This textual information would be backed by maps of the area.

In FIG. 2, if client selects Senior 25 the chapter identity subset numbers would be; Senior/Barbados 25/39 chapter 5100, Senior/Bermuda 25/40 chapter 5300, Senior/Canada 25/41 chapter 5500 and so forth. If client selects Sports 26 the chapter identity subset number of one sport Golf 26-A which would include Golf/Barbados 26A/39 chapter 8200, Golf/Bermuda 26A/40 Chapter 8500, Golf/Canada 26A-41 chapter 8800 and so forth.

Secondary organizational hierarchy FIG. 3 continues the composition process with Canadian province subsets. Golf/ British Columbia 26A/43, for instance, would be chapter 9700. Therefore, Senior/Canada 25/41 chapter 5500 combined with Golf/Canada 26A/41 chapter 8800 and Golf/ British Columbia 26A/43 chapter 9700 would compose an individual sales presentation 49 as represented in FIG. 6 with chapter selections displayed 50.

Integration of LOCAL 21 and REMOTE 30 to compose a sales presentation 52 is a combination of 51 as previously created in 49 and the transitory information 53 from the computerized reservation system 1. Organizational hierarchy, FIG. 2 includes a matrix for necessary information from the remote data sources. For example, Airline Destination Cities 31 could display Canadian cities providing airline service 31/41. Assuming the Senior/Canada/Golf/British Columbia client's presentation integrates Airline Destination Cities/British Columbia 31/43 as shown in FIG. 3 would be displayed. Additional scheduling information 55 such as; Hotel Availability 33A/43 and Airport Transfers 33B/43 would be displayed 54 to complete the sales presentation. It will be understood that multiple data sources can be incorporated in the sales presentation display and calculation of the individual tour expenses can be performed by the microprocessor 14. If the client desires a hard copy of this information it would be available from printer 7, creating an individualized travel brochure for the client.

An important advantage of the highly efficient hierarchical organization of the data bases is the ability of retrieving interrelated information either textual or graphical, by accessing one topic. For instance, the selection of a particular hotel by name would trigger the display of its accommodations along with a touring map of the area fetched from the same local database, as well as data on available airlines services to that area derived from a remote database. Similarly, starting from the graphical display of a touring map, the user may retrieve textual and graphical data about a particular hotel in the area.

This tour creating flexibility, allows the computerized reservation system 1 to market 'special' or discounted tours with short-term availability. Historically, tour operators have been restricted in their ability to promote and market 'special' or discounted tours. The invention solves this dilemma by enhancing computerized reservation system capabilities while presenting timely travel and tour presentations in an individualized sales system.

The travel presentation would continue and if the client desired to reserve or purchase the tour package, the travel agent would process in a traditional manner. Additionally, complex, time-consuming Foreign Individual Tour planning is simplified and made more accurate.

The teaching of this invention allows both the client and travel agent to access travel and tour sales presentations in a highly organized manner. All the necessary functions to create and display individualized sales presentations are performed automatically. This results in significant savings of time for the client and travel agent and will potentially generate additional sales for the travel industry.

It is expected that the automated sales system will be a more convenient means to promote, compose and sell tour packages. Clients should benefit from a more comprehensive presentation of the intangible product of travel. The interactive video and computerized reservation system program design is developed with authoring programs which are well-known to those skilled in the electronic arts.

It will be understood that this automated sales system may be applied to many other types of customer service and sales industries. Some examples are retail sales and real estate and various financial services, as illustrated by the first alternate embodiment of the invention disclosed below.

Figure 7:
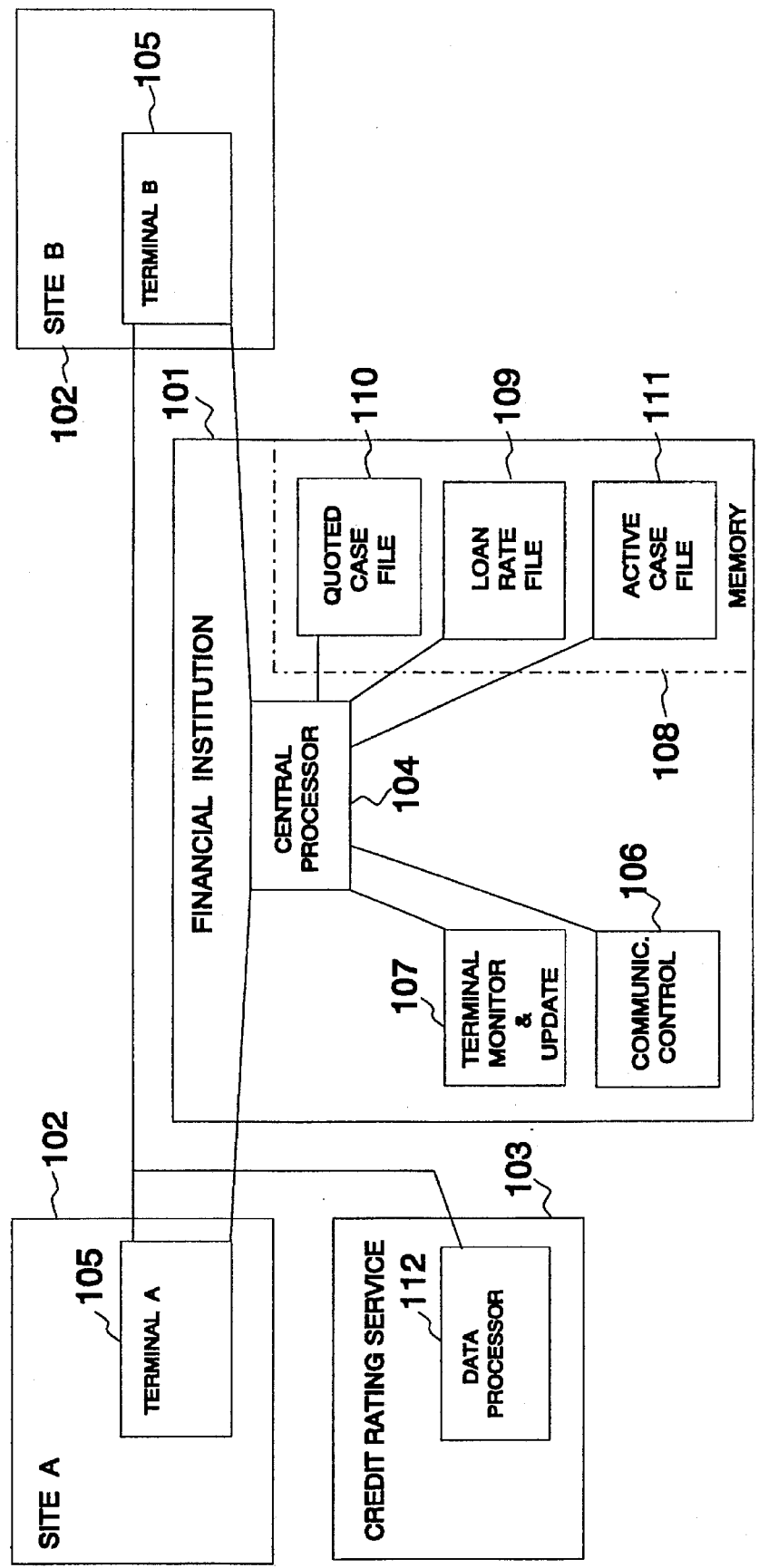
FIG. 7 is a general block diagram of the system for automatically processing loan applications according to the first alternate embodiment of the invention.

There is shown in FIG. 7 the general block diagram of an automatic loan processing terminal system. This system may be considered an improvement of the system disclosed in parent application Ser. No. 613,525, now U.S. Pat. No. 4,567,359 whose disclosure is incorporated herein by reference.

The system links a financial institution 101, a plurality of self-service terminals at various remote sites 102 and a credit rating service 103 by telephone lines or other means of telecommunication. The financial institution 101 is provided with a central processor 104 which is used primarily to process loan applications and handle other financial transactions. The central processor 104 has a communication interface which allows it to access the various terminals 105 at the remote sites and be accessed by them at any time of the day. A communication control unit 106 associated with the central processor 104 assures an orderly sending and receiving of information between the terminals and the central processor. The communication control unit 106 provides for a quick transfer of batches of information to and from the terminals 105 under direct access memory mode. Direct access memory modes are achieved by means of high speed data exchange units such as those manufactured by Metacomp, Inc. of San Diego, Calif. and sold under the mark METAPAKS. The central processor 104 is also provided with a terminal monitor and update unit 107 which is programmed for periodically polling the various terminals 105 in order to verify their status and proper operation and to update the data stored in those terminals as may be required. The memory 108 of the central processor 104 holds some files 109 in which are stored textual information about the various loans available to customers from the institution. This information includes loan rates and repayment schedules. These loans include real estate loans, loans to finance the purchase of automobiles, boats and other vehicles, personal loans secured by certificates of deposit, stocks and other assets controlled by the financial institution 101 and unsecured personal loans. Loan packages which have been quoted to customers are stored in a quoted case file 110 pending acceptance and execution by the applicant. Once a loan has been approved and accepted it is processed and monitored through an active case file 111. The credit rating service 103 is an institution such as TRW CREDENTIAL SERVICE which maintains financial files of consumers based on past and current loan payment obligations, credit card uses and balance sheets provided as part of loan applications, and makes that information available to a membership of merchants and financial institutions who need to access the credit worthiness of a particular customer. The credit rating service information is processed automatically by a data processor 112 equipped with automatic communication interface. This interface allows direct access through telephone lines or other communication networks by any subscribing member. The confidentiality of the credit rating service files is guaranteed by use of identifying codes which must be provided with each request.

The system operates as follows. The central processor 104 of the financial institution 101 periodically sends to the terminals 105 at the various sites 102 loan rate information and other data pertinent to the loans available from that institution which are extracted from the loan rate file 109. That textual information is stored in the various terminals and can be reviewed by an applicant in need of a loan. Once the applicant has selected a type of loan which is available from the institution, he is asked to provide the pertinent personal information data which will be necessary to process his loan application. The information provided by the applicant is supplemented by a financial profile obtained directly from the credit rating service after being automatically requested by the terminal 105. The terminal 105 is programmed to compute the credit worthiness of the applicant and to approve or disapprove the loan. Once the loan has been approved the applicant is requested to accept it or reject it. Accepted loan information is transmitted to the central processor of the financial institution and stored in the active case file 111. Information about loans which have not been accepted on the spot, are also transmitted to the financial institution and stored for a period of time in the quoted case file 110. The customer can return to one of the terminals and accept that loan anytime during the validity period.

Figure 8:
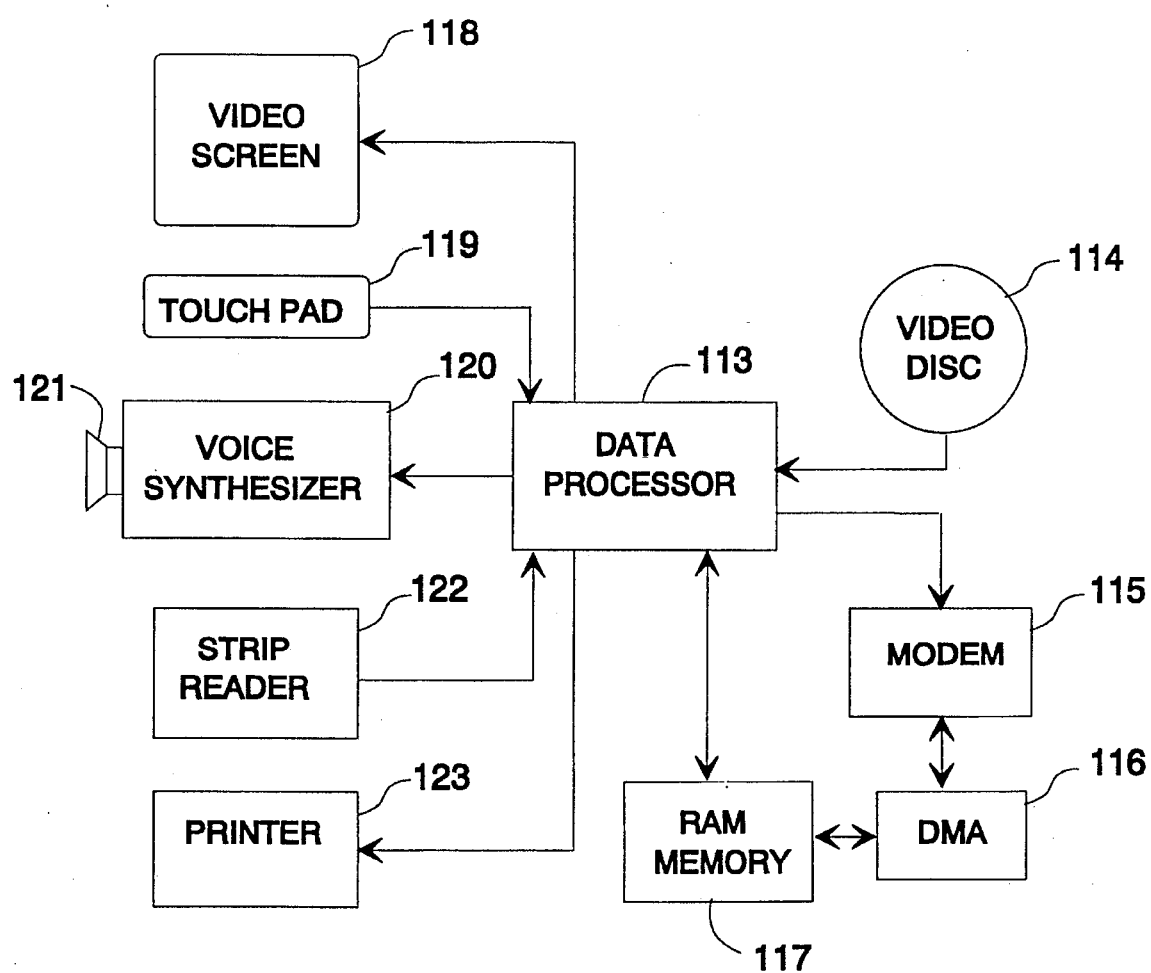
FIG. 8 is a block diagram showing the major components of the terminal.

Turning now to FIG. 8, there is shown a block diagram of the various components of a terminal 105. The operation of the terminal is controlled by a data processor 113. To the left of the processor, various blocks represent the peripheral equipment which interfaces with the applicant. To the right of the processor there is shown a videodisc 114 on which are stored all the permanent data necessary for the operation of the terminal including the data necessary to effect the interactive and automatic request of information by the terminal from the applicant. A modem 115 provides a two-way communication channel with the financial institution 101 and the credit rating service 103. The modem is controlled by the data processor 113 and handles a batch of information through a direct memory access unit 116, to and from a RAM memory 117. Thus, the RAM memory can be used to hold textual data obtained from the loan rate files 109 at the financial institution as well as applicant's financial profiles obtained from the credit rating service 103. The RAM memory can also be used to store some of the operating routines necessary for the operation of the terminal.

Communication with the applicant is done mainly through the video screen 118. The video screen 118 displays the picture of a fictitious loan officer who informs the applicant about the various types of loans available as well as the manner in which the application can be filed. The applicant answers the request of a loan officer by means of a touch pad 119 or a keyboard. Any entry made by the applicant on the touch pad 119 is processed and orally repeated immediately by means of a voice synthesizer 120 and loud speaker 121. The oral expression of the answers provided by the applicant is a way to assure that no false entry is made. A magnetic strip reader 122 may be provided so that the applicant can give an account number or an identification by means of a credit card. A printer 123 is used to deliver to the applicant a hard copy of any loan quotation as well as a confirmation of his accepted loan.

Figure 9:
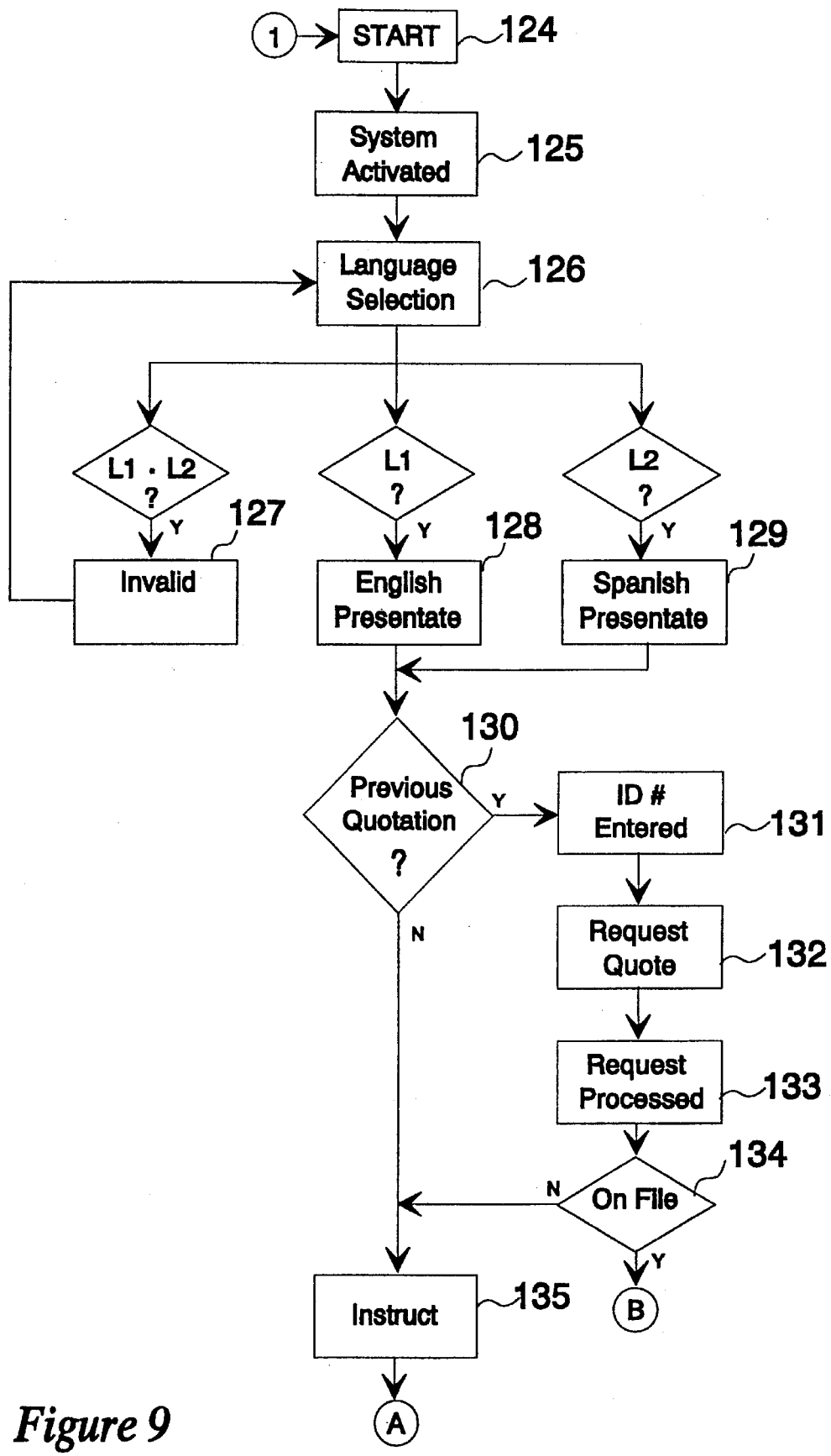
FIGS. 9 to 11 are detailed flow diagrams of the system operation.

FIG. 9 is a flow diagram of the system operation during the initial phase of the loan application process. The start 124 of system operation is triggered either by the applicant pushing a start button or by the automatic detection of his presence in front of the terminal. Once the system is activated 125 the recording of an image and sound of a fictitious loan officer is read from the videodisc 114 and graphically appears on the video screen 118. The fictitious loan officer takes the applicant through a language selection routine 126–129. In this case the applicant is asked in both English and Spanish in what language the loan transaction is to be conducted. In this phase of the operation as well as all interactive communications between the loan officer and the applicant, the loan officer explains to the applicant how to enter his answer by means of the touch pad 119. The applicant is then asked whether a previous quotation has already been prepared for him 130. In the affirmative, he is then requested 131 to enter a pass number or identification number either by entering the number on the touch pad or by running his credit I.D. card through the strip reader 122. The terminal then addresses the financial institution and requests 132 the prior loan quotation stored in the quoted case file 110 of the central processor 104. This is done by the data processor 113 of the terminal dialing the institution phone number through the modem 115 and sending a request message. The terminal goes into a standby mode with its DMA unit 116 waiting for a transfer of information from the line into the RAM memory 117. The continued operation depends on whether or not the previous quotation is found 134 to be on file. If the answer is negative, the fictitious loan officer instructs 135 the applicant how to proceed to apply for a loan. In the case where a previous quotation is found to be on file, that quotation is transferred to the terminal according to the program routine B illustrated in FIG. 11.

Figure 10:
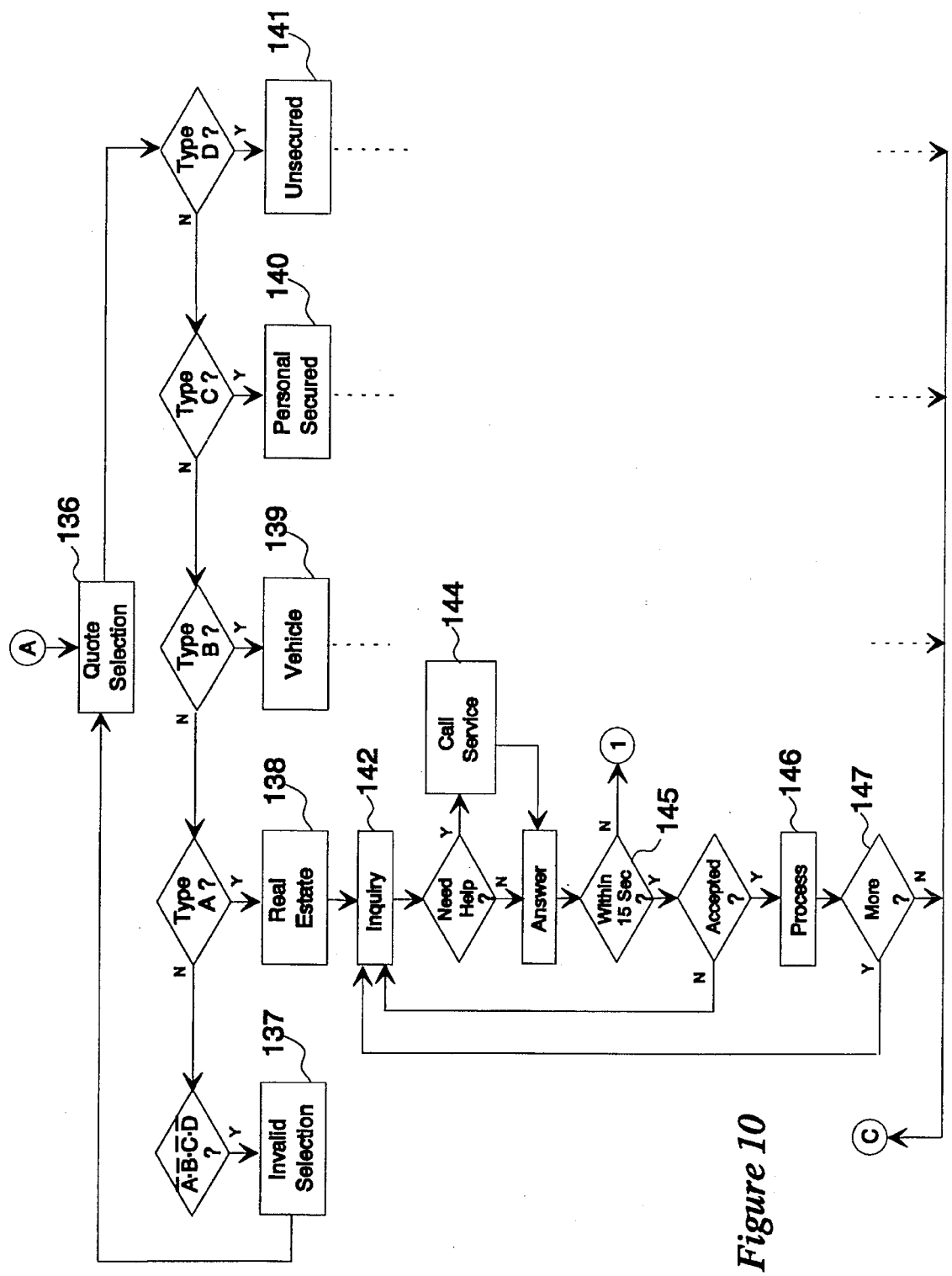

FIG. 10 is the flow diagram of the system operation during the acquisition of information by the terminal from the applicant. The applicant is first asked to select 136 the type of loan in which he is interested. In this case, he is offered a menu allowing him to choose between a real estate loan 138, a vehicle loan 139, a personal loan 140 secured by an asset held by the financial institution or a personal unsecured loan 141. Any invalid selection 137 triggers a new request. Once a type of loan has been selected, a real estate loan, for example, the fictitious loan officer asks a series of inquiries corresponding to the questions that would be found on a standard loan application form. For each question the system performs a subroutine 142–145 designed to guarantee proper input of the information into the terminal memory 117. If a problem develops during the question and answer period, the applicant is invited to call 144 the loan service at the financial institution. If the answer to a question is not received within fifteen seconds 145, the process of application is presumed to have been abandoned by the applicant and the system returns to its initial standby state. Once all the proper answers have been accepted they are processed 146 by the terminal data processor 113. This process may involve analyzing certain key answers in order to identify any element or data that would automatically disqualify the applicant. Depending upon the result of that first analysis, more questions 147 may be presented to the applicant in order to refine the data necessary for a thorough assessment of his qualifications, or to provide additional information for the applicant.

For instance, the fictitious loan officer may ask, "Are you familiar with our loan repayment schedule?" If the customer desires to read the loan repayment schedule, he would indicate his choice. The loan schedule would then be textually displayed. After reading the text, the applicant would proceed to more questions 147 presented by the fictitious loan officer. The customer could continue to additional textual displays about legal responsibilities of obtaining a loan or return to the fictitious loan officer who would continue the presentation.

Figure 11:
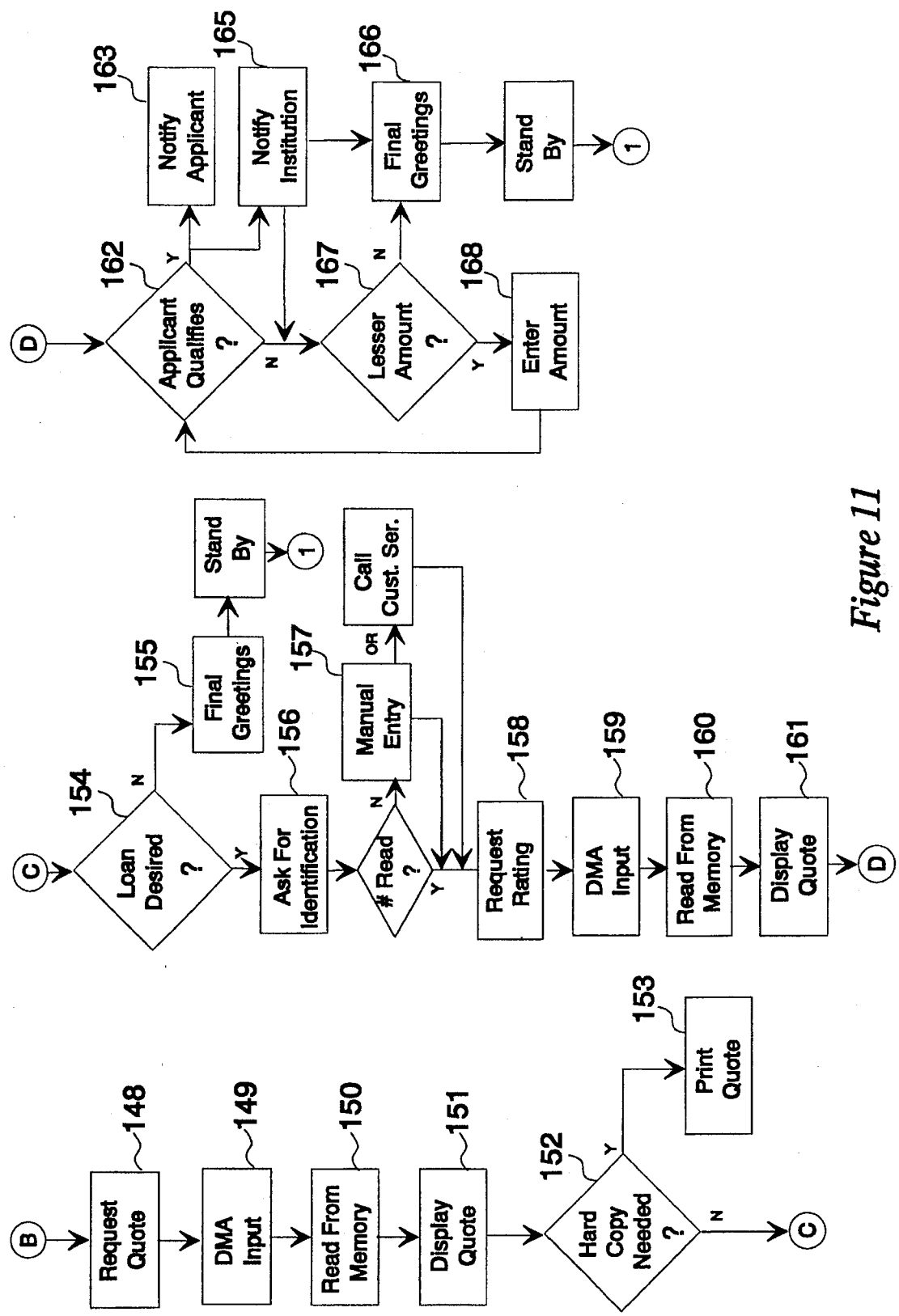

Turning now to FIG. 11, the B subroutine used to receive a previous quotation from the financial institution is illustrated in the first flow diagram. Once the previous quotation is requested 148 the DMA unit 116 of the terminal is allowed to receive a batch of information containing the previous quotation. This batch of information is stored in the RAM memory 117 from where it is fetched 150 and displayed 151 on the video screen 118. The applicant is then asked if he wants a hard copy 152 of the quotation. In the affirmative, the previous quotation is printed 153 on printer 123. The second flow diagram corresponds to the acquisition of the applicant's financial profile from the credit rating service 103. Once a loan quotation has been presented to the applicant he is asked whether or not he wants to apply for the loan 154. If his answer is negative, the fictitious loan officer expresses final greetings 155. The loan quotation, if not already in storage at the financial institution, is transmitted there for temporary storage in the quoted case file 110 of the central processor 104. If the applicant wishes to apply for the loan, he is asked to provide a password or identification 156 which will allow the terminal to access his file at the credit rating service 103. As previously explained, this number can be entered directly by means of an identification card run through the strip reader 122 or entered manually 157 by means of the touch pad 119. The terminal requests a rating 158 from the credit rating service 103 in a manner similar to the one used and described previously for obtaining a previous quotation from the financial institution. The applicant's financial profile is received as a batch of information through the DMA unit 159 and then read from the memory 160. The financial profile is then analyzed by the terminal in order to compute 161 a debt ratio or other criterion devised by the financial institution to access the credit worthiness of the applicant. The debt ratio is the ratio of the applicant's current expenses to his current income. Other parameters such as debt to equity ratio or fixed assets to debt may be computed by the terminal data processor 113 and used in determining the qualifications of the applicant. It should be noted that the entire decision whether or not to grant the loan is performed automatically and onsite by the terminal 105 without intervention whatsoever from any of the financial institution personnel, except in case of breakdown in communications requesting a direct phone call by the applicant to the financial institution.

The last flow diagram on the drawing represents the final phase of the loan application transaction. Once the terminal equipment has determined that the applicant qualifies 162 for the loan, the applicant is so notified 163, and instructed how to obtain the loan funds. The institution is also notified 165, and the loan is processed through the active case file 111 by the central processor 104. The fictitious loan officer closes the transaction by giving his final greetings 166 before the system is returned to a standby condition. If the applicant does not qualify for the amount of loan requested, he is first asked whether a lesser amount 167 would be acceptable to him. He is then instructed to enter the lesser amount 168 through the touch pad 119. That new amount is then checked against the determination already made by the terminal. The process is repeated until an acceptable amount is requested by the applicant, or until such time as the applicant declines to proceed with the loan application.

It should be noted that the system as described could be applied to other forms of transactions in which information has to be acquired from a customer then processed to a decision or into the performance of a particular task. A similar system could be used, for instance, for the preparation and filling-out of income tax returns. In such case, the assistance that the fictitious person who appears on the video screen can give to the applicant in filing the tax form can be easily programmed on the videodisc.

A system adapted to the sale of real estate properties would use interrelated textual and graphical information stored on the videodisc 114. The inquiries 142 displayed on the video screen 118 would consist of real estate information designed to both inform and address applicants needs. To facilitate customer interaction, the graphical display could include city maps designated by zip code areas so the applicant could indicate the location of his or her current residence. Other interrelated displays would present types of dwellings, i.e., single, family or commercial, of pictorial representations which aid the applicant in determining his or her loan needs.

Other applications of the system include the selection and purchase of stocks and other securities, the selection and opening of so-called 'self-directed investments' such as Individual Retirement Accounts, and other complex transactions which normally require a great deal of time and attention on the part of the officers of an institution.

Figure 12:
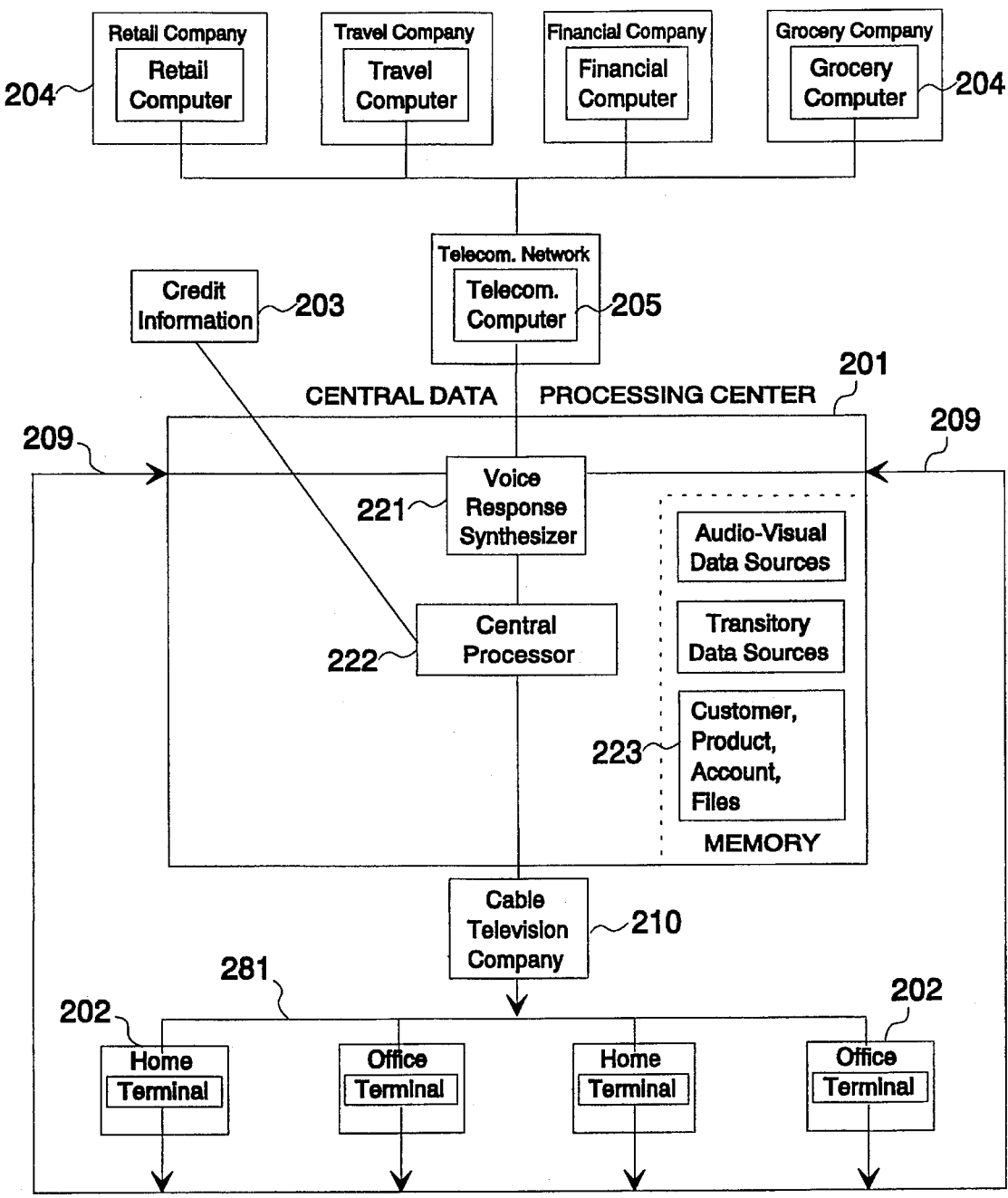
FIG. 12 is a general block diagram showing an overview of a system for automatically dispensing information, goods and services according to the second alternate embodiment of the invention.

FIG. 12, a second alternate embodiment, shows an overview of an automatic system for dispensing information, goods and services from multiple retail, travel, financial, grocery and other service industries.

The system basically comprises a data processing center 201 linked to various remote sites, including one or more information and sales stations 202, a credit reporting service terminal 203, and data processing terminals 204 of various goods and services providers. The station and terminals are all linked to the central data processing center by any suitable remote links such as phone line data and cable television communications 209. The provider's terminals 204 are indirectly linked to the data processing center 201 via a computerized telecommunication network service such as TELENET® 205. Each of the providers and the system has its own specific account number with the service, which can be accessed by either party to submit or retrieve information at periodic intervals.

Figure 17:
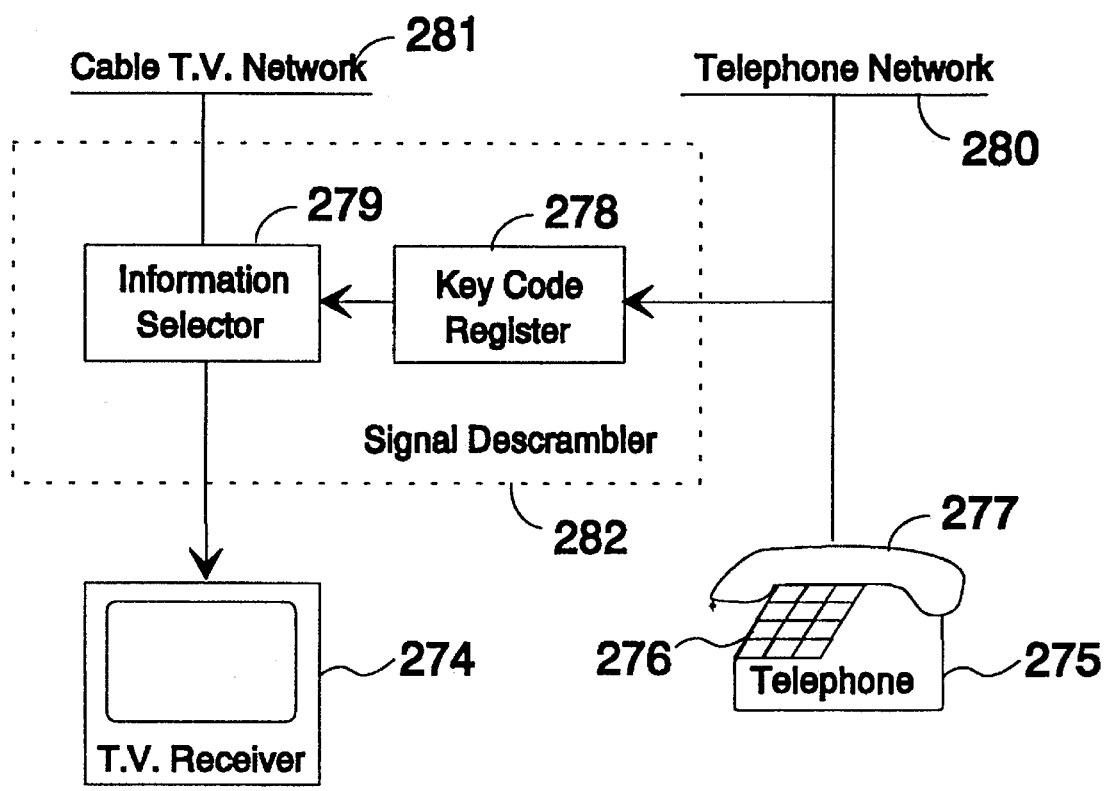
FIG. 17 is a functional block diagram of a home or office station.

In this embodiment of the invention, numerous sales and information stations 202 are provided at a series of locations such as homes or offices. The terminals are all remotely linked to the data processing center. The information and sales terminals 202, typically comprise a CRT monitor, audio-speaker device and controller located in the customer's residence or office. The CRT monitor receives selected prerecorded audio-visual segments via the cable television company's communication links 209, generated at the data processing center 201. As illustrated in FIG. 17, this equipment may consist of a common television receiver 274 and a dial tone telephone, also located in the customer's residence or office, that functions as the entry device allowing selection of various audio-visual presentations to be displayed on the television screen.

Once a voice communication has been established between the telephone handset 275 and the data processing center, the tone generating keypad 276 is used to generate and send to the processor by way of the telephone network 280, coded instructions representing a request for information to be displayed on the television receivers 274. After viewing the requested information on his television set, the customer can use the telephone keypad 276 to order goods or services selected among those displayed on the television receiver. The customer also can transmit a credit account number against which the purchase can be charged. Voiced requests, orders or payment authorization could also be transmitted by means of the telephone handset 277 to be automatically recognized and interpreted by an automatic speech recognition device at the data processing center. Since the data processing center transmits a great deal of information to be accessed by a large number of stations through a common cable television network 281, the television receivers 274 must be coupled to an information selector unit 279 which looks for information which has been specifically addressed to that particular station and routes it to the television receiver 274. The address code which is used as a key by the information selector 279 to select data on the cable television network 281 may be a fixed number permanently entered into the information selector, or a variable number which is generated from the keypad 276 as part of the requests for goods or services and temporarily stored in a key code register 278 to be fed to the information selector 279. The same key code is also stored at the data processing center as it is transmitted on the telephone network 280 and is used to frame the specific information which is transmitted over the cable television network 281. Preaddressed information may also be periodically transmitted over the cable television network 281. The address or access number to available products or services may be published in printed catalogs for use from the various stations to request specific displays of information. The information selector 279 and key code register 278 may be part of the cable television signal descrambling device 282 such as those commonly used with pay cable television services. This type of communication system is based on the well-known technology such as was disclosed in U.S. Pat. No. 3,746,780 Stetten et al. and other patents cited in the background of this specification.

The data processing center 201, basically comprises a tone or voice response system, host computer and data sources. The tone or voice response system 221 receives the customer's selections in audio signal form and converts the signals to messages which are transmitted to the central processor 222 for selection of data sources. Additionally, the tone or voice response system allows customers the ability to enter requests on their keypads and receive audio information in the form of synthesized human speech which is transmitted via the standard telephone communication links. Features of voice response systems include; interfaces with all major host computers, high quality digitally encoded voice, extended storage capacity of synthesized speech, support for multiple software applications and the ability to handle dozens of simultaneously incoming calls. A suitable voice response system is the VCT Series 2000®, manufactured by Voice Computer Technologies Corporation, although many alternatives are available.

The host computer can be one of those manufactured by IBM, NCR or Digital Equipment Corporation, which has the ability to direct the incoming requests, store and manage the data sources and generally perform data processing functions.

The data sources typically consist of prerecorded audio-visual segments stored on optical discs and transitory alpha-numeric price and stock information stored in the host computer's memory. Although several data storage technologies can perform the audio-visual product presentation including digitized information, the preferred choice is optical disc storage. Optical disc storage technology is commonly referred to as videodisc and CD-ROM. Suitable optical storage discs are Scotch® Laser Videodiscs manufactured by 3M Corporation. Industrial videodisc players which are designed for allowing sequential or random access of 54,000 individual video frames or the playback of 30 minutes of full-motion on a single disc, include model LD-6200 manufactured by Pioneer Communications of America, Inc. The LD-6200 has the extensive capabilities of the IEEE-488 parallel interface port which is particularly well suited for multiple player control with a single external computer. Multiple laserdisc players controlled from a single external computer offer a flexible configuration allowing simultaneous access from numerous users with system expansion a factor of customer demand. To increase the enhancement of still-frame video presentation, audio compression technology is utilized. Still-frame decoder technology which allows 30 seconds of audio compression in an individual video frame is the subject of U.S. Pat. No. 4,429,332, Television Compressed Audio. This technology increases the optical disc data sources communicative capacity with audio compression and is available in model VAC-300 manufactured by EECO, Inc.

Although several alternative transmission technologies exist, it is assumed that cable television operating companies can provide one of the most reliable, high quality audio-visual transmission networks. Cable television transmission of selected audio-visual segments can be achieved by multiple means including addressable video signal encryption configured at the cable head end and downloaded to a decoder at the home terminal for program descrambling.

The customer activates the audio-visual presentations by dialing the keypad 276 requesting access to the system through the telephone network 280 to the data processing center 201. A voice response system 221 at the data processing center accepts the customer's inquiries and audibly answers questions from its voice synthesis storage. Customer requests for audio-visual presentations are relayed from the voice response system to the central processor 222, which selects the appropriate data sources for transmission to the local cable television company 210 and routed via the cable network 281 to the customer's terminal 202. The customer upon viewing the presentation, which includes a menu, selects from the displayed menu on the video screen his next selection which is then entered on the keypad and is transmitted to the central data processing center for assembly of the requested informational segment to be routed to the sales and information terminal. This circuitous sequence continues until the customer; decides to abort access, is terminated due to preset time allotments or purchases a product or service. If he decides to order a service or product he would then enter his purchase and payment by either an account identification or credit card number on the telephone keypad 276, which would be authorized upon verification of the customer's credit worthiness by a credit information service or the central data processing center. Upon acceptance of the customer's order, the central data processing center would transmit to the customer's station a confirmation number and order fulfillment information which is displayed on the video screen. Customer orders for goods or services are then transmitted to the provider 204 for order fulfillment.

The interfacing of the various components of the system described above is done according to standard practices well known to those skilled in the electronic arts.

The data processing center 201, includes a central processing unit 222 and memory 223. The memory 223 stores graphical program information, management of the audio-visual sources and textual information on prices of products and services acquired from the providers, which are periodically updated from the terminals 204 of the various companies, and information on customer requests and orders which can be accessed periodically by the respective providers. The processing unit 222 operates in response to program instructions for performance of product and service calculations in response to customer information and orders received from any of the stations, to send audio-visual product and service data to the respective stations, to receive credit account numbers from the stations and access the credit reporting terminal for credit approval or disapproval of a particular account. If a customer places a purchase order from a station after credit is approved, the data processing unit stores the information and sends a confirmation to the terminal.

Figure 13:
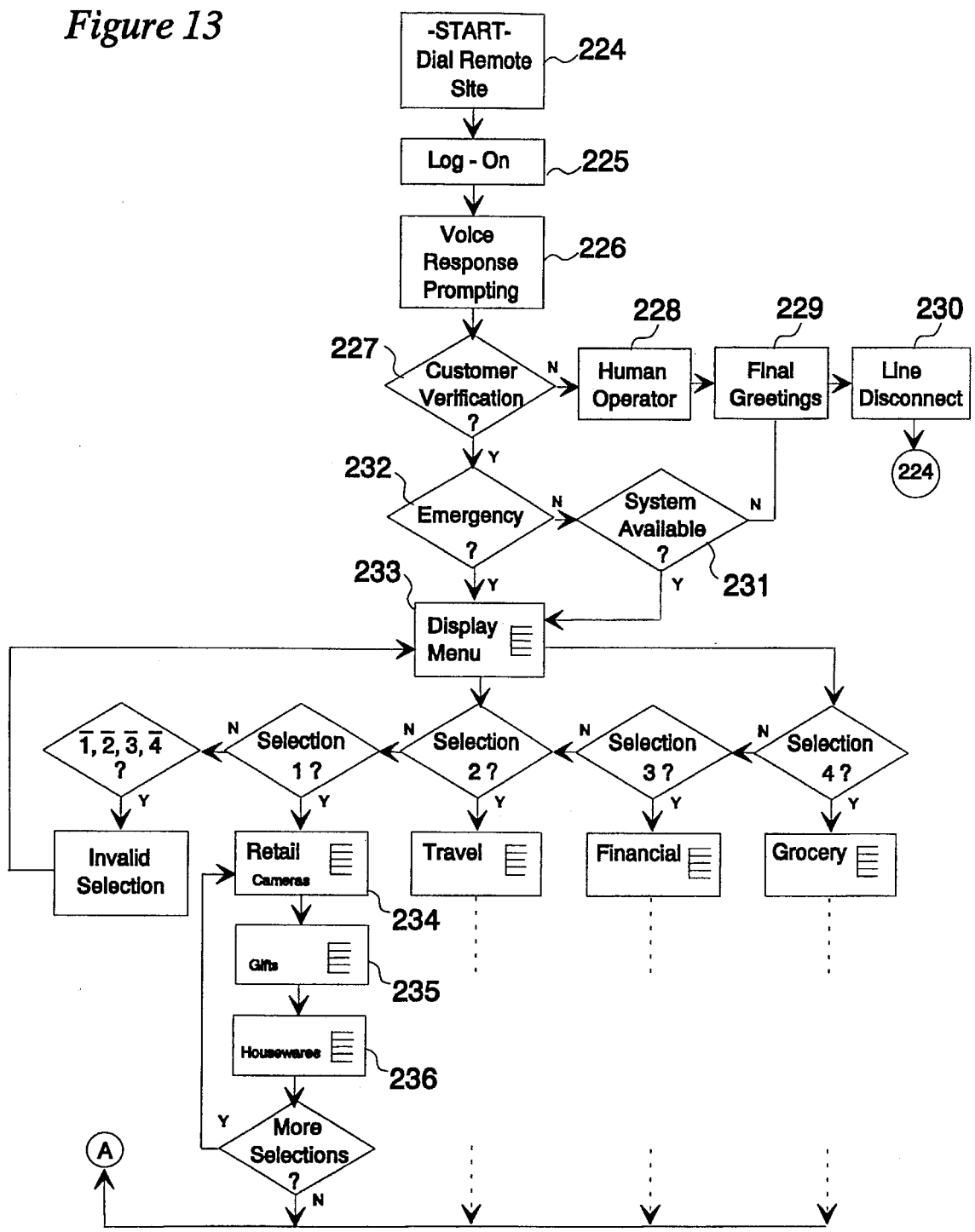
FIGS. 13 to 16 are detailed flow diagrams of the system.
Figure 14:
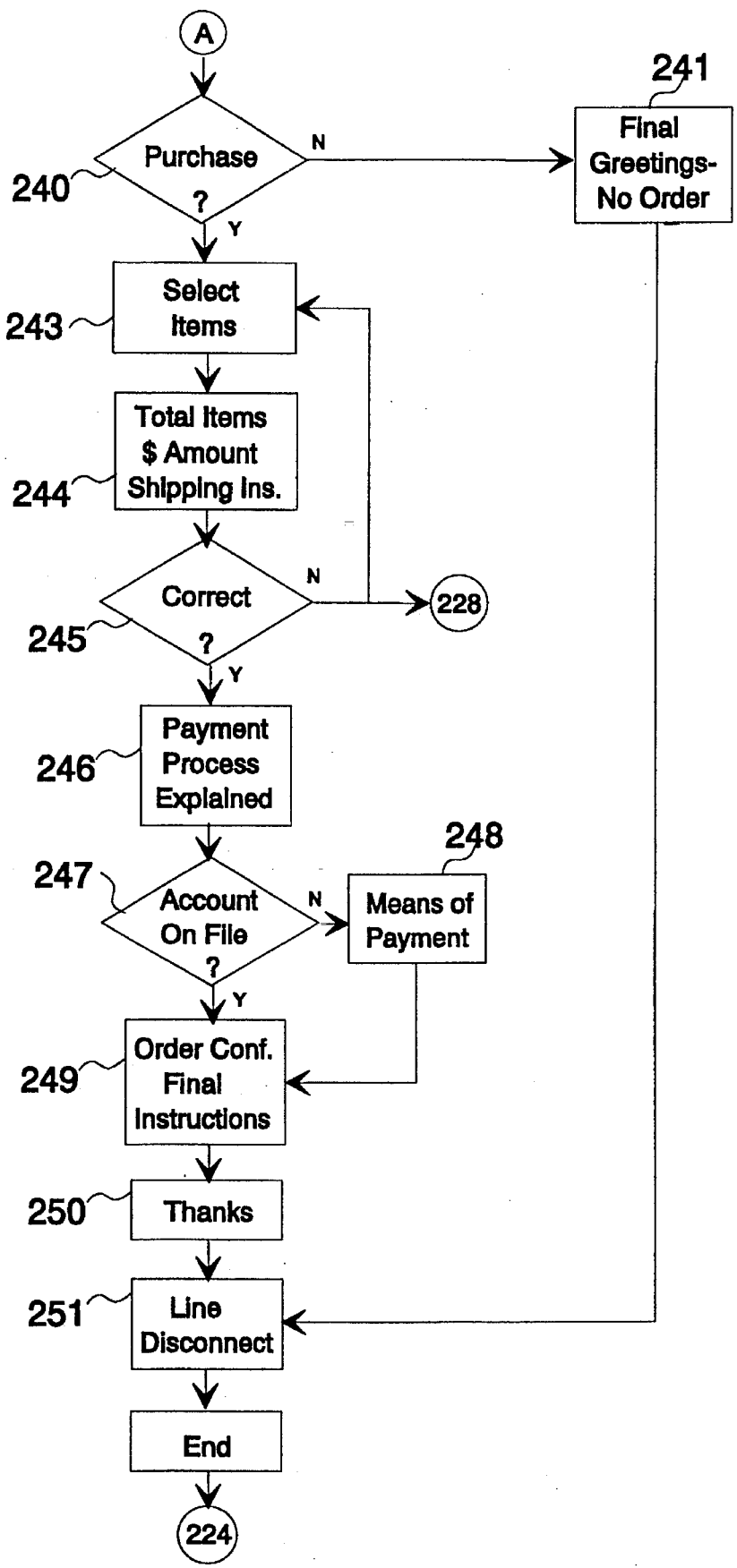
Figure 15:
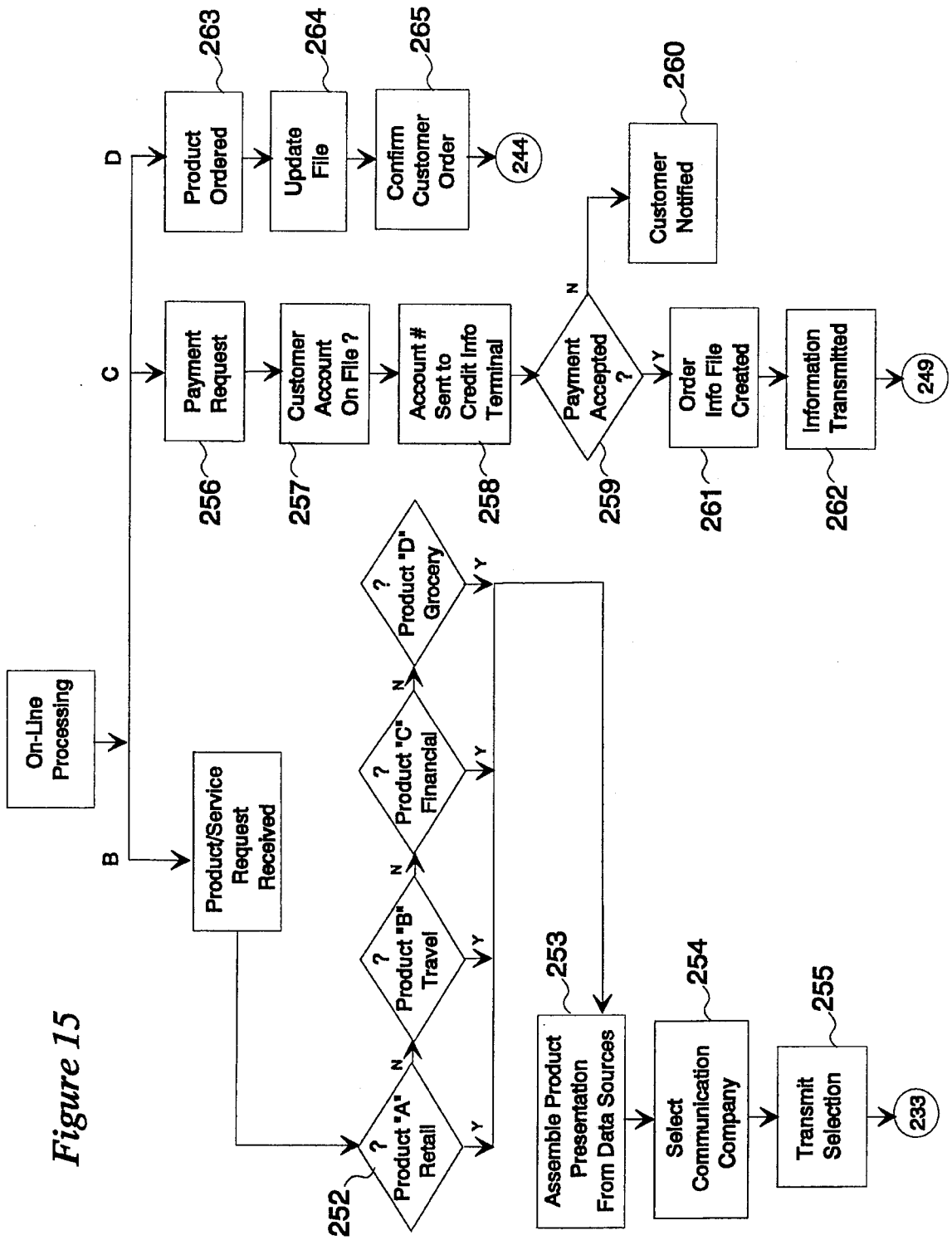
Figure 16:
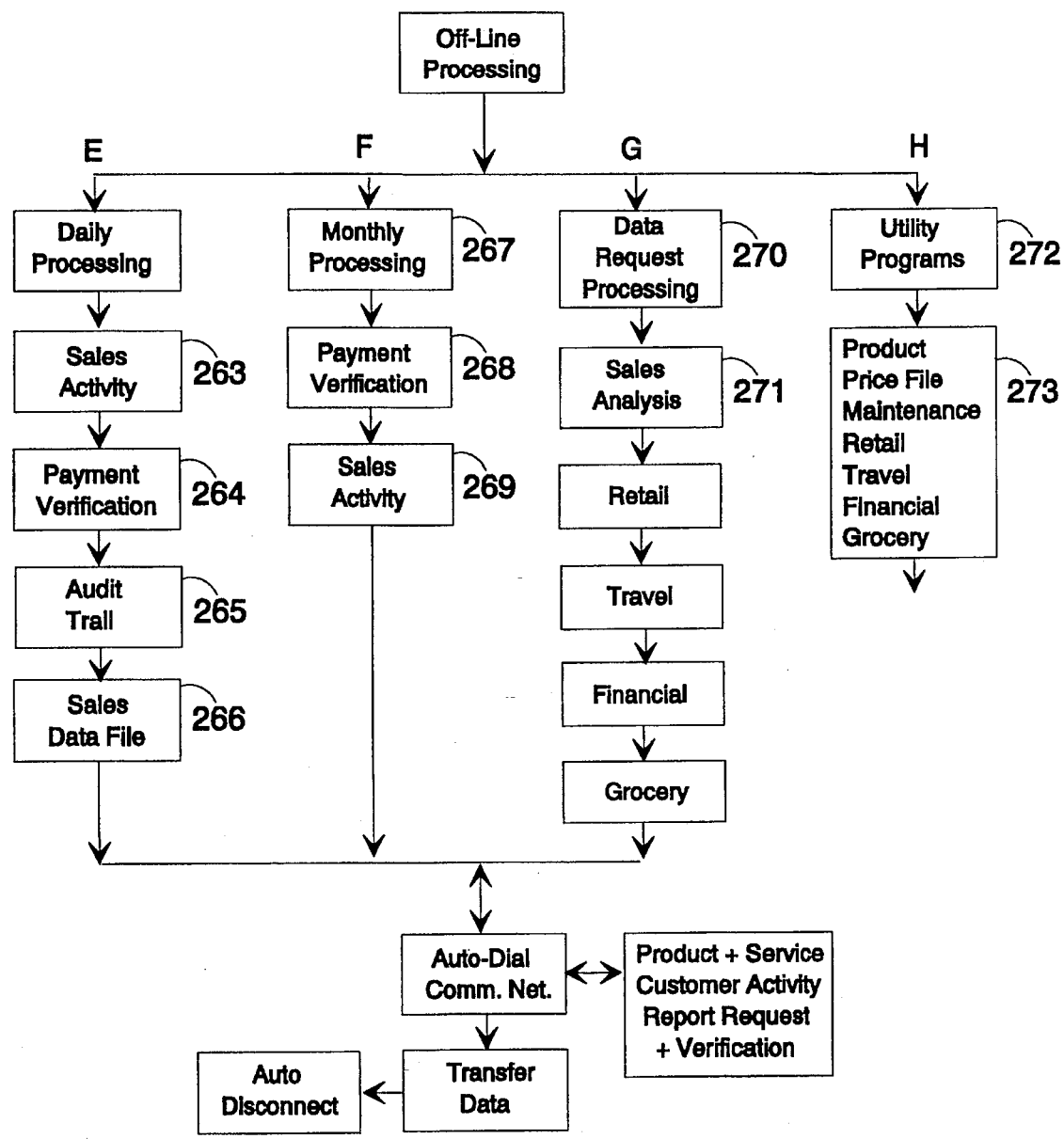

The various programs for executing the operations of the sales and information terminal and the data processing center computer 222 are of a 'menu-type' and can best be understood with reference to the flow diagrams of FIGS. 13 through 16. FIGS. 13 and 14 show the sequence of operations executed at the sales and information terminal 202 and FIGS. 15 and 16 show the operations performed by the data processing center's computer 222 for the on-line and off-line processing and communications with the providers.

The sequence of operations basically comprises the following steps:

(1) The customer activates the system by entering a sequence of numbers, on the keypad device, which are transmitted to the data processing center;

(2) A voice response system at the data processing center acknowledges customer's inquiry, verifies his authenticity and interrogates the customer to determine the desired services;

(3) The voice response system transmits the customer's requests to the central processor;

(4) The central processor selects the appropriate data storage sources and transmits the audio-visual information to the customer's local cable television company communication links;

(5) Requested information and menus are relayed through the cable channel and displayed on the CRT video screen;

(6) If the customer wishes to purchase a product or service he proceeds with the payment protocol as displayed on the CRT and enters the form of payment, on the keypad, which is then transmitted to the data processing center;

(7) Upon authorization of payment, a confirmation message is transmitted from the data processing center to the sales and information station's video display monitor;

(8) Upon completion of customer access the system disconnects;

(9) The data processing center stores the information on products or services sold;

(10) At the end of every day, the data processing center transmits information on the daily sales activities for each provider to the appropriate files of the Telenet® computer;

(11) The sales information for each provider can be accessed from its terminal linked to the Telenet® computer. At the same time, the service providers can transmit updates on prices and products to their system account at the Telenet® computer.

These steps will now be described in more detail with reference to FIGS. 13 to 16.

Referring now to FIG. 13, each sales and information terminal will be in an inactive state with system activation initiated by the customer entering a number on the keypad 276 and requesting access to services 224 from the data processing center 201. If access is available through an open line, the customer logs on 225 and begins a synthesized speech dialogue with a voice response system 226. For example, the voice response system may ask, "Are you interested in connecting to our shopping service?", "If yes, please press key #3" or "Do you have a question about a previous order?", "If yes, please press key #4." The audio interaction verifies the customer's identification 227 and determines their geographic location for routing of requested presentations. The dialogue also determines if emergency access 232 to the system is required. The customer responds to the questions by entering his answers on the keypad 276. If a customer is unable to dialogue with the voice response system, he may enter a specific key for communication with a human operator 228. The human operator would assist the customer with questions, emergency access or selections of program material. If the human operator is unable to provide assistance, he thanks the customer 229 and the communication would cease 230.

If data sources are available for access 231, the voice response system begins a transmission of signals to the central processor 222, for selection of data sources. If the customer has an emergency 232 the voice response system activates a priority mode to the central processor and begins an immediate routing of presentation of an emergency menu display 233, on the customer's video display screen.

An important aspect of the present invention is its ability to transmit emergency life-saving instructions to consumers. For example, a mother whose young child has just ingested poison or received a serious cut could access the system, state that an emergency has occurred and the system would interrupt any current user on conflicting transmission links and begin presentation of emergency first-aid medical information. Simultaneously the system would alert medical authorities or personnel as to the injury. In many instances, audio-visual medical emergency procedures can serve critical needs during the first few minutes of injury, drowning or heart attack. Consumers would have instantaneous access to a comprehensive first-aid 'assistant' in the form of audio-visual presentations specifically addressing medical needs in their home or office.

The menu display 233 presents a series of selections in which choices are available to navigate through the numerous decision-making branches of possible interactions. The main menu 233 presents the general categories of products and services which are available such as: retail, travel, financial and grocery. The interactive sequence of customer-selected information displayed on the television receiver is continuous and a typical audio-visual presentation would include choices accompanied with numbers which correspond to the keypad 276 of the telephone or similar control device. For example, key #5 would be—repeat, key #6 would be—return to main menu, key #7 would be—new selection and so forth. The customer would then be able to enter on his controller device the next desired sequence of information. The customer can quickly locate a specific product or service by defining his selections through the menu. For example, if the customer is interested in lamps he would begin with a retail display menu 234. The customer would then select from the second frame, home furnishings 235 and from the third frame of home furnishings the customer would select lamps 236. Therefore, within three consecutive interactions the customer commences evaluation of various lamp features. The current price of the lamp and other transitory information is stored in the data sources 223 and by use of an overlay, this timely textual information is superimposed and displayed simultaneously, with the prerecorded audio-visual presentations. Therefore at all times current price and product availability are maintained by the central data processing center 201 and presented to the customer.

If the customer encounters any problems in operating the system he or she can enter a specific command on the control device to communicate with a human operator for assistance.

Referring now to FIG. 14, during the selected presentations the menu also displays a numbered key for entry on the control device for an order of a product or service 240. Product ordering menu questions would include; quantity, color, sizes and styles. If the customer decides he doesn't wish to continue or order products or services he is offered a final greeting 241, and the system access is disconnected 251. Once the customer has completed his selection 243 the data processing center tabulates the orders and other relevant information and transmits the desired purchase summary to the sales and information terminal 244. The menu asks the customer 245 if the ordered items are correct? Assuming the customer proceeds with the purchase, he would examine the listed items textually displayed on the monitor's screen and either accept or correct the list. If incorrect, the customer would continue the interactive menu sequence or contact the human operator for assistance 228. When the customer has completed his selections he would proceed to the payment process menu 246. This menu explains the various forms of payment, typically the customer has an established account number on file 247. The customer would enter a PIN (Personal Identification Number), credit card number 248 or other suitable payment data manually on the keypad. Once the payment data has been obtained by the central data processing center a payment verification procedure is initiated, as will be described in more detail below in connection with FIG. 15. The procedure results in either rejection or acceptance of payment and corresponding data is transmitted from the data processing center to the terminal and displayed on the television screen.

If payment is rejected, the customer can either insert additional payment information 248 on the keypad or call the customer service for assistance 228.

If payment is accepted, 249 the customer receives a confirmation number that is displayed on the television and is asked to enter any additional delivery information, such as a person or address that is to receive the product or service ordered or a specific time of the day for delivery. The customer is then thanked, the dial-up line to the data processing center 201 is disconnected, and the terminal communication to the data processing center returns to an inactive state 224.

The sequence of operations conducted by the data processing center 201 performing product and service selections, executing credit checks and issuing sales confirmations will now be described with reference to the flow diagram parts, shown in FIG. 15.

When the data processing center receives a product or service request B from one of the sales and information stations 202, it first determines the type of product or service required 252. The central processor 222 then locates the appropriate graphical and/or textual information for that product from its transitory and audio-visual data sources for assembly and transmission to the selected communications company 254 and subsequently to the terminal 255.

Upon receipt of payment verification request C from a terminal 256, the data processing center locates the customer's account file 257 from its memory or transmits the account number to the credit information terminal 258. The results of the verification process 259 are received by the processing center and relayed to the terminal. If payment is rejected, the customer is notified at the terminal 260. If payment is accepted, a product or service information record 261 is created at the data processing center and the customer is notified at the sales and information terminal 262.

After the data processing center has processed D the product payment 263, it issues a confirmation at the terminal and the product or service information file is updated with the name and address of the customer 264. The product or service confirmation is transmitted to the terminal for acceptance by the customer 265.

The data processing center 201 performs a number of programmed off-line operations at periodic intervals, as illustrated by the flow diagram in FIG. 16. The product and service information files stored in the memory are updated daily.

The data processing center routinely performs a series of daily activity status reports E. The daily reports include a sales activity report 263 listing all sales and service transactions for the particular day's processing, payment verification reports 264 listing all payments verified by company number sequence, and audit trail reports 265 listing all sales for a particular company or geographic regions, customer profiles and other marketing information.

A sales data file 266 is created for all sales transacted for each company in that particular day's processing. This file is forwarded to the appropriate service provider's computer terminal 204 via Telenet® to be entered in their automated billing system. The data processing center dials a central computer such as the Telenet® computer 205 to which all the service provider company's terminals are linked, logs-on to the appropriate account for each company, and transmits the appropriate daily reports and sales data files to each company's specific Telenet® account. The product or service provider can then retrieve the information in its account at its pleasure by dialing the Telenet® computer from its own computer terminal 204, to process and complete order fulfillment.

The data processing center also performs monthly processing programs F, these routines 267 consist of valuable sales data compilation which includes a payment verification report listing all payments verified for a given company during that month 268 and a sales activity report listing all sales processed for a specific company for a particular month 269. These reports are transmitted to the relevant account numbers of the Telenet® computer for subsequent retrieval by the respective companies and the daily reports.

Data requests G can also be made by the individual service providers via their terminals 204 and the Telenet® computer 270. When a service provider wants a certain program to be performed, a memo is sent from the company's terminal to the specific Telenet® account number for the data processing center, stating which report is to be processed. The reports G which can be requested in this way are the sales analysis reports 271 and reports for each type of product or service for a specific company. The sales reports allow each company to update its price rates and product availability in the system as necessary. The sales analysis reports can provide listings by company, product type, date, and time of day. Therefore service providers can obtain valuable market research and analyze their advertising and sales promotion for specific products.

Programs H are provided for maintaining current product and service prices stored by the data processing center. The prices are updated by checking the rate files for each company's product line offered 272. Utility programs are maintained for all product and service providers 273.

The system of this invention allows a customer convenient access to numerous products and service providers in a variety of industries and allows the customer to make a selection and purchase products on a self-service or operator-assisted basis. All the necessary operations of obtaining information, checking credit and transmitting information to the respective companies are performed automatically. Significant savings in time and money will be realized for both the consumer and companies that will potentially result in more sales and increases in productivity because thousands of consumers will have greater accessibility to the service providers in their homes.

The general public will benefit from direct marketing communication channels with manufacturers and monetary savings will be realized as traditional retail product sales overhead is reduced.

It will be clear that this system may be applied to many other types of customer service and sales industries. Some examples are the educational industry, many types of governmental services, and the medical and health industries.

While the preferred embodiments of the invention have been described, modifications can be made and other embodiments may be devised without departing from the spirit of the invention and the scope of the appended claims.

What is claimed is:

1. A computer search system for retrieving information, comprising:

means for storing interrelated textual information and graphical information;

means for interrelating said textual and graphical information;

a plurality of entry path means for searching said stored interrelated textual and graphical information, said entry path means comprising:

textual search entry path means for searching said textual information and for retrieving interrelated graphical information to said searched text;

graphics entry path means for searching said graphical information and for retrieving interrelated textual information to said searched graphical information;

selecting means for providing a menu of said plurality of entry path means for selection;

automatic data processing means for executing inquiries provided by a user in order to search said textual and graphical information through said selected entry path means and for fetching data as a function of other data;

indicating means for indicating a pathway that accesses information related in one of said entry path means to information accessible in another one of said entry path means;

accessing means for providing access to said related information in said another entry path means; and output means for receiving search results from said processing means and said related information from said accessing means and for providing said search results and received information to such user.

2. The search system according to claim 1, wherein said textual information comprise words, phrases, numbers and letters stored in said at least one database.

3. The search system according to claim 1, wherein said graphical information include maps, charts, pictures, and moving images.

4. The search system according to claim 1, wherein one of said graphical and textual information comprises audio information.

5. The search system according to claim 1, wherein said graphical and textual information are stored on a CD-ROM disc.

6. The search system according to claim 1, further comprising a micro-computer for executing operations of said search system, and for storing said graphical and textual information.

7. The search system according to claim 1, wherein said textual entry path means and said graphical entry path means include informing means for assisting a user in searching said graphical and textual information.

8. The search system according to claim 1, wherein said textual search entry path means comprises a topic tree entry path means for dividing said textual information into topics and sub-topics in order to assist in browsing through said textual information.

9. The search system according to claim 1 which further comprises:

title finder entry path means for assisting a user in uncovering titles stored in said stored textual information.

10. A computerized system for selecting and ordering a variety of information, goods and services, which comprises:

a plurality of computerized data processing installations programmed for processing orders for said information, goods and services;

at least one computerized station, said station including:

a micro-processor;

a device for displaying graphical and textual material;

at least one mass memory device controlled by said micro-processor;

means for addressing at least one of said computerized data processing installations, and for sending thereto and receiving therefrom, coded messages and batches of data;

program means for controlling the display on said display device of inquiries and acceptable answers;

user operated means for selecting at least one of said acceptable answers;

means for accumulating a set of said acceptable answers;

automatic data processing means for processing said set of answers as a function of other data;

means for storing in said mass-storing device, interrelated textual information and graphical information;

means for interrelating said textual and graphical information;

a plurality of entry path means for searching said stored interrelated textual and graphical information;

means, responsive to said means for processing, for executing inquiries provided by said user and for searching said textual and graphical information through said selected entry path means;

said means for executing and searching, including means for addressing at least one of said installations and for retrieving data related to said answer; and means responsive to said means for processing, for transferring orders for said information, goods and services to said installations.

\* \* \* \* \*

UNITED STATES PATENT AND TRADEMARK OFFICE
CERTIFICATE OF CORRECTION

PATENT NO. : 5,576,951
DATED : November 19, 1996
INVENTOR(S) : Lawrence B. Lockwood Page 1 of 4

It is certified that error appears in the above-identified patent and that said Letters Patent is hereby corrected as shown below:

In Column 1, line 38, replace "processing," with --processing--.

In Column 1, line 57, replace "reserve-and" with --reserve and--.

In Column 2, line 47, replace "person," with --person--.

In Column 2, line 63, replace "by" with --by the--.

In Column 4, line 28, replace "and shop" with --to shop--.

In Column 4, line 32, replace "The system" with --This system--.

In Column 5, line 13, replace "communication's" with --communication--.

In Column 6, line 60, replace "passive" with --his passive--.

In Column 7, line 44, replace "their" with --his--.

In Column 7, line 51, replace "up-dated" with --updated--.

In Column 9, line 54, delete the reference character "A1".

In Column 17, line 6, replace "office," with --office--.

In Column 18, line 63, replace "customer;" with --customer--.

In Column 19, line 44, replace "numbers," with --numbers--.

In Column 21, line 45, replace "payment, typically" with --payment. Typically,--.

In Column 22, line 24, replace "D" with --D,--.

UNITED STATES PATENT AND TRADEMARK OFFICE
CERTIFICATE OF CORRECTION

PATENT NO. : 5,576,951  
DATED : November 19, 1996  
INVENTOR(S) : Lawrence B. Lockwood It is certified that error appears in the above-identified patent and that said Letters Patent is hereby corrected as shown below:

In Column 23, line 52, replace "textual" with --textual information--.

In Column 23, line 55, replace "textual" with --textual information--.

In Column 23, line 59, replace "text" with --textual information--.

In Column 23, line 56, replace "graphics" with --graphical--.

In Column 23, line 67, replace "textual" with --textual information--.

In Column 24, line 14, replace "numbers" with -- numbers,--.

In Column 24, line 20, replace "graphical" with --graphical information--.

In Column 24, line 23, replace "graphical" with --graphical information--.

In Column 24, line 27, replace "graphical" with --graphical information--.

In Column 24, line 30, add --search-- between "textual" and "entry".

In Column 24, line 32, replace "graphical" with --graphical information--.

In Column 24, line 44, replace "goods" with --goods,--.

UNITED STATES PATENT AND TRADEMARK OFFICE
CERTIFICATE OF CORRECTION

PATENT NO. : 5,576,951  
DATED : November 19, 1996  
INVENTOR(S) : Lawrence B. Lockwood Page 3 of 4

It is certified that error appears in the above-identified patent and that said Letters Patent is hereby corrected as shown below:

In Column 24, line 48, replace "goods" with --goods,--.

In Column 24, line 51, replace "graphical" with --graphical information--.

In Column 24, line 51, replace "material" with --information--.

In Column 24, line 65, replace "mass-storing" with --mass memory--.

In Column 25, line 1, replace "textual" with --textual information--.

In Column 25, line 4, replace "textual" with --textual information--.

In Column 25, line 7, replace "textual" with --textual information--.

In Column 26, line 5, replace "goods" with --goods,--

UNITED STATES PATENT AND TRADEMARK OFFICE
CERTIFICATE OF CORRECTION

PATENT NO.  : 5,576,951
DATED       : November 19, 1996
INVENTOR(S) : Lawrence B. Lockwood It is certified that error appears in the above-identified patent and that said Letters Patent is hereby corrected as shown below:

In Figure 9, numbers 128 and 129, replace "Presentate" with --Presentation--.

Signed and Sealed this

Tenth Day of February, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,576,951
DATED : NOVEMBER 19, 1996
INVENTOR(S) : LAWRENCE B. LOCKWOOD

It is certified that error appears in the above-identified patent and that said Letters Patent is hereby corrected as shown below:

Claim 9, Column 24, line 38, change "1" to --1,--.

Claim 10, Column 26, line 6, change "installations" to --installation--.

Signed and Sealed this

Ninth Day of June, 1998

Attest:

BRUCE LEHMAN

Attesting Officer

Commissioner of Patents and Trademarks

(12) EX PARTE REEXAMINATION CERTIFICATE (6109th)
United States Patent
Lockwood

(10) Number: US 5,576,951 C1
(45) Certificate Issued: *Jan. 29, 2008

(54) AUTOMATED SALES AND SERVICES SYSTEM

(76) Inventor: Lawrence B. Lockwood, 5935 Folsom Dr., La Jolla, CA (US) 92037

Reexamination Request:
No. 90/006,625, May 5, 2003

Reexamination Certificate for:
Patent No.: 5,576,951
Issued: Nov. 19, 1996
Appl. No.: 08/210,301
Filed: Mar. 16, 1994

(*) Notice: This patent is subject to a terminal disclaimer.

Certificate of Correction issued Feb. 10, 1998.

Certificate of Correction issued Jun. 9, 1998.

Related U.S. Application Data

(63) Continuation-in-part of application No. 08/116,654, filed on Sep. 3, 1993, now Pat. No. 5,309,355, which is a continuation of application No. 07/396,283, filed on Aug. 21, 1989, now abandoned, which is a continuation-in-part of application No. 07/152,973, filed on Feb. 8, 1988, now abandoned, which is a continuation-in-part of application No. 06/822,115, filed on Jan. 24, 1986, now abandoned, which is a continuation-in-part of application No. 06/613,525, filed on May 24, 1984, now Pat. No. 4,567,359, application No. 90/006,625, which is a continuation of application No. 08/116,654, filed on Sep. 3, 1993, now Pat. No. 5,309,355, and a continuation of application No. 08/096,610, filed on Jul. 23, 1993, now abandoned, application No. 90/006,625, which is a continuation-in-part of application No. 08/096,610, filed on Jul. 23, 1993, now abandoned, which is a continuation of application No. 07/752,026, filed on Aug. 29, 1991, now abandoned, which is a continuation of application No. 07/168,856, filed on Mar. 16, 1988, now abandoned, which is a continuation of application No. 06/822,115, filed on Jan. 24, 1986, now abandoned, which is a continuation-in-part of application No. 06/615,525, filed on May 24, 1984, now Pat. No. 4,567,359.

(51) Int. Cl.
*G06F 17/30* (2006.01)

(52) U.S. Cl. .................. 705/27; 705/26; 235/381
(58) Field of Classification Search ............. 705/26–27; 235/381
See application file for complete search history.

(56) References Cited

PUBLICATIONS

"Comp–U–Store System Could Change Retail Economics," Direct Marketing, vol. 46, No. 3, Jul. 1983, pp. 101–107.*

(Continued)

*Primary Examiner*—Robert M. Pond

(57) ABSTRACT

A system for composing individualized sales presentations created from various textual and graphical information data sources to match customer profiles. The information search and retrieval paths sift through a hierarchy of data sources under multiple operating programs. The system provides the means for synergistically creating and displaying customized presentations in a convenient manner for both the customer and salesperson to achieve a more accurate, efficient and comprehensive marketing presentation. Organizational hierarchies of data sources are arranged so that an infinite number of sales presentation configurations can be created. Multiple micro-programs automatically compose the sales presentations initiated by determinants derived from customer profile information, sales agent assessment data and operator's entries including the retrieval of interrelated textual and graphical information from local and remote storage sources. A similar system can be used for filing applications with an institution from a plurality of remote sites, and for automatically processing applications in response to each applicant's qualifications. Each multimedia terminal comprises a video screen and a video memory which holds co-related image-and-sound-generating information arranged to simulate the aspect and speech of an application loan officer on the video screen. The simulated loan officer is used to acquire personal loan data from the applicant by guiding him through an interactive sequence of inquiries and answers.

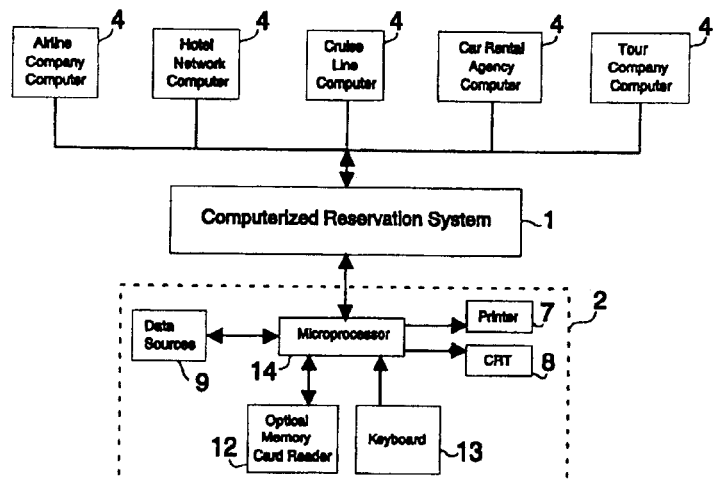

PUBLICATIONS

"Globecom '82, IEEE Global Telecommunications Conference," Conference Record vol. 3 of 3, Miami, Nov. 29 to Dec. 2, 1982.*

"Discount Store News, The Newspaper of the Discount Department Store Industry," vol. 22, No. 3, Feb. 7, 1983.*

Electronic Retailing—Emerging Methods & Markets, Walter Forbes, Comp–U–Card International Inc, May 1983.*

How Video Will Change the Sale, Ellen Kleinberg, Industrial Marketing, Apr. 1981.*

"Implications of COnsumer Information Processing Research for the Design of COnsumer Information Systems," Gabriel Biehal, The Journal of Consumer Affairra, vol. 17, No. 1, 1983.*

Information Networks: Gardner, David W.;"Computer users have hundreds of data bases to chose from," Dun's Business Month, Apr. 1983, v121p99, Dialog file 148 #01750698, 2pgs.*

Information Networks: Veit, Stan; "Helpful hints on how to use the various communication networks that are available on your mircrocomputer, (the computer maze, part 1)," Computers & Electronics, Mar. 1983, v21p60, Dialog file 275 #01042224, 4pg.*

Information Networks: Veit, Stan; "The computer network maze: part 2: concluding a description . . . communications networks can be utilized to you best advantage," Computer & Electronics, Apr. 1983, v21p84, Dialog file 148 #01749760, 2pgs.*

Comp–U–Store: Klapper, Marvin; "Stevens sets computer selling test in 7 stores," WWD, May 9, 1983, v145p24, Dialog file 148 #01759835, 1pg.*

UU: Interactive Video: Braden, Lisa; "The action in interactive video," Retailing Home Furnishings, May 2, 1983, v57pA1, Dialo file 148 #01748240, 3pgs.*

VV: Interactive Video: Paper #6, PTO–892, Item V grouped as a collection of prior art referred to as "Interactive Video."*

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 is confirmed.

New claims 11–32 are added and determined to be patentable.

11. *The search system of claim 1, wherein said means for storing includes means for storing audio data.*

12. *The search system of claim 11, wherein said audio data is stored at a plurality of remote locations linked by a computerized telecommunication network to exchange said data.*

13. *The search system of claim 1, wherein said indicating means for indicating a pathway comprises a menu of program choices related to said search results, for accessing other information.*

14. *The search system of claim 1, which further comprises address codes of pathways to information related to one of said inquiries.*

15. *The search system of claim 1, which further comprises means for selectively requesting and retrieving specific information sequences from a personal computer at a site remote from said computer search system.*

16. *The search of claim 1, which further comprises means for feeding to said output means, a non-requested marketing message.*

17. *The search system of claim 1, which further comprises program means for presenting information in a hierarchical arrangement of topics and sub-topics.*

18. *The search system of claim 1, which further comprises program means for providing said related information in audio and video forms.*

19. *The search system according to claim 1, wherein said graphical information and textual information are stored on a mass memory device.*

20. *The system of claim 10, wherein said batches of data comprise audio data.*

21. *The system of claim 10, which further comprises means for displaying at said station, a non-requested marketing message.*

22. *The system of claim 10, wherein said textual information comprise words, phrases, numbers, and letters.*

23. *The system of claim 10, wherein said graphical information comprises maps, charts, pictures, and moving images.*

24. *The system of claim 10, wherein one of said graphical information and textual information comprise audio information.*

25. *The system of claim 10, wherein said graphical information and textual information are stored on a mass memory disc.*

26. *The system of claim 10, wherein said entry path means include informing means for assisting a user searching said textual and graphical information.*

27. *The system of claim 10, wherein said entry path means comprise a topic tree entry path for dividing said textual and graphical information into topics and sub-topics.*

28. *The system of claim 10, which further comprises title finder entry paths for assisting a user in uncovering titles stored in said mass memory device.*

29. *The system of claim 10, wherein said station is remotely located from said installations.*

30. *The system of claim 29, wherein said station and installations are linked by a computerized telecommunication network.*

31. *The system of claim 30, wherein said services comprise the transfer to said computerized station of textual, graphical, audio, and audio-visual data; and*

*said data related to said answer comprise availability and identification of services to be ordered.*

32. *The system of claim 10, which further comprises a plurality of operating program choices related to said retrieved data, for accessing other data.*

\* \* \* \* \*

(12) EX PARTE REEXAMINATION CERTIFICATE (9640th)
United States Patent
Lockwood

(10) Number: US 5,576,951 C2
(45) Certificate Issued: *May 9, 2013

(54) AUTOMATED SALES AND SERVICES SYSTEM

(76) Inventor: Lawrence B. Lockwood, La Jolla, CA (US)

Reexamination Request:
No. 90/012,685, Sep. 15, 2012

Reexamination Certificate for:
Patent No.: 5,576,951
Issued: Nov. 19, 1996
Appl. No.: 08/210,301
Filed: Mar. 16, 1994

Reexamination Certificate C1 5,576,951 issued Jan. 29, 2008

Certificate of Correction issued Feb. 10, 1998
Certificate of Correction issued Jun. 9, 1998

(*) Notice: This patent is subject to a terminal disclaimer.

Related U.S. Application Data

(63) Continuation-in-part of application No. 08/116,654, filed on Sep. 3, 1993, now Pat. No. 5,309,355, which is a continuation of application No. 07/396,283, filed on Aug. 21, 1989, now abandoned, which is a continuation-in-part of application No. 07/152,973, filed on Feb. 8, 1988, now abandoned, which is a continuation-in-part of application No. 06/822,115, filed on Jan. 24, 1986, now abandoned, which is a continuation-in-part of application No. 06/613,525, filed on May 24, 1984, now Pat. No. 4,567,359, application No. 08/210,301, which is a continuation of application No. 08/116,654, and a continuation of application No. 08/096,610, filed on Jul. 23, 1993, now abandoned, which is a continuation of application No. 07/752,026, filed on Aug. 29, 1991, now abandoned, which is a continuation of application No. 07/168,856, filed on Mar. 16, 1988, now abandoned, which is a continuation of application No. 06/822,115, filed on Jan. 24, 1986, now abandoned, which is a continuation-in-part of application No. 06/615,525, filed on May 24, 1984, now Pat. No. 4,567,359.

(51) Int. Cl.
*G06Q 30/00* (2006.01)

(52) U.S. Cl.
USPC .................. 705/26.62; 705/26.81; 235/381

(58) Field of Classification Search
None
See application file for complete search history.

(56) References Cited

To view the complete listing of prior art documents cited during the proceeding for Reexamination Control Number 90/012,685, please refer to the USPTO's public Patent Application Information Retrieval (PAIR) system under the Display References tab.

*Primary Examiner* — K. M. Reichle

(57) ABSTRACT

A system for composing individualized sales presentations created from various textual and graphical information data sources to match customer profiles. The information search and retrieval paths sift through a hierarchy of data sources under multiple operating programs. The system provides the means for synergistically creating and displaying customized presentations in a convenient manner for both the customer and salesperson to achieve a more accurate, efficient and comprehensive marketing presentation. Organizational hierarchies of data sources are arranged so that an infinite number of sales presentation configurations can be created. Multiple micro-programs automatically compose the sales presentations initiated by determinants derived from customer profile information, sales agent assessment data and operator's entries including the retrieval of interrelated textual and graphical information from local and remote storage sources. A similar system can be used for filing applications with an institution from a plurality of remote sites, and for automatically processing applications in response to each applicant's qualifications. Each multimedia terminal comprises a video screen and a video memory which holds co-related image-and-sound-generating information arranged to simulate the aspect and speech of an application loan officer on the video screen. The simulated loan officer is used to acquire personal loan data from the applicant by guiding him through an interactive sequence of inquiries and answers.

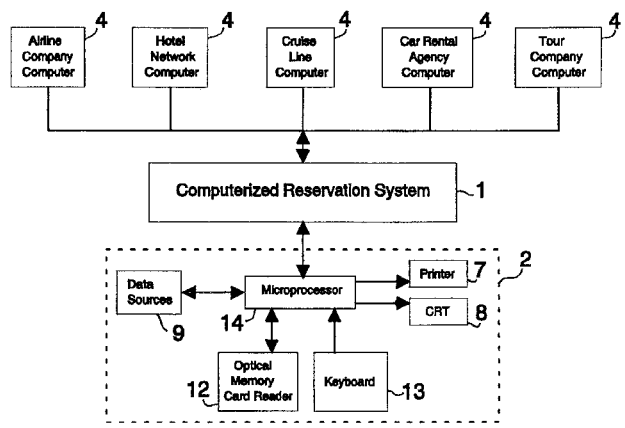

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-32 is confirmed.

\* \* \* \* \*